MAGNETIC RECORDING AND REPRODUCING APPARATUS

Filed Nov. 20, 1967 16 Sheets-Sheet 4

Nov. 25, 1969 HIROO HOSONO ET AL 3,480,230

MAGNETIC RECORDING AND REPRODUCING APPARATUS

Filed Nov. 20, 1967 16 Sheets-Sheet 7

MAGNETIC RECORDING AND REPRODUCING APPARATUS

Filed Nov. 20, 1967 16 Sheets-Sheet 8

MAGNETIC RECORDING AND REPRODUCING APPARATUS

Filed Nov. 20, 1967 16 Sheets-Sheet 12

3,480,230
MAGNETIC RECORDING AND REPRODUCING APPARATUS

Hiroo Hosono, Osaka, and Michinori Nagahiro, Hirakata-shi, Japan, assignors to Matsushita Electric Industrial Co., Ltd., Osaka, Japan, a corporation of Japan Filed Nov. 20, 1967, Ser. No. 684,344
Claims priority, application Japan, Nov. 26, 1966, 41/77,924, 41/77,925, 41/77,926, 41/77,927; Dec. 7, 1966, 41/80,706, 41/80,707
Int. Cl. B65h 75/40
U.S. Cl. 242—191 6 Claims

ABSTRACT OF THE DISCLOSURE

This specification discloses a magnetic recording and reproducing apparatus in which the opposite ends of a tape are fixed to a supply reel and a take-up reel as in a cartridge type apparatus. In the present apparatus, there is provided a tape termination detecting mechanism which is adapted to detect the fact that rotary members such as reel shafts, pinch roller, etc. rotated in association with the tape transportation are stopped when such tape transportation is finished, thereby stopping the tape transport mechanism or reversing the direction of the tape transportation.

This invention relates to a multi-channel cassette type magnetic recording and reproducing apparatus, and more particularly it pertains to a magnetic recording and reproducing apparatus of such a cartridge type that a tape has its opposite ends secured to a supply reel and a take-up reel respectively, including a tape end detecting mechanism of simplified construction which is adapted to automatically stop the tape transport mechanism and the like or reverse the tape winding direction by detecting the fact that a rotary member adapted for rotation in association with the tape transportation effected by means of the reel shaft, pinch roller and the like is stopped when the tape is entirely wound on the tape-up reel so that the tape transportation is ceased by the tape tension.

In a magnetic recording and reproducing apparatus such as the cartridge type one, it is required that the internal tape transport mechanism rotating the capstan, and the electric circuits be stopped from operating, or that the tape transportation be automatically reversed to cause the tape to be wound onto the supply reel so that the tape transport mechanism and electric circuits may be maintained in an operating state when the recording or playback operation has been completed, that is, when the tape transported from the supply reel has entirely been wound on the take-up reel.

In an attempt to meet such requirements, a variety of tape termination detecting devices have already been proposed, but they cannot be used essentially in a satisfactory way since they are complicated in construction, incapable of accurate detection and/or expensive.

It is a primary object to provide a magnetic recording and reproducing apparatus using a multi-channel cassette, including a novel mechanism adapted for automatic tape reversal by channel selection.

Another object of this invention is to provide a magnetic recording and reproducing apparatus, comprising a main rotary member rotated in association with the tape transportation, an auxiliary rotary member rotated irrespective of the tape transportation, and a movable member operated in accordance with variation in the relative rotation between said main and auxiliary rotary members, wherein when the tape transportation is completed, the tape transport mechanism is stopped or reversed directly or through actuation of a switch by the operation of said movable member in accordance with the variation in the relative rotation between said main and auxiliary rotary members.

A further object of this invention is to provide a magnetic recording and reproducing apparatus, comprising a main rotary wheel adapted for rotation in association with the tape transportation, an auxiliary rotary wheel adapted to be rotated in the opposite direction to that of said main rotary wheel at a slightly lower peripheral speed than that of said main rotary wheel irrespective of the tape transportation, and a roller which is rotatably supported on a rotary lever through a shaft to be in contact with said two rotary wheels, wherein when the rotation of the main rotary wheel is stopped upon completion of the tape transportation, said roller is intruded between the two rotary wheels by the rotation of the auxiliary rotary wheel, and thereby the rotary lever is moved to stop or reverse the tape transport mechanism directly or by actuating switch means.

A still further object of this invention is to provide a magnetic recording and reproducing apparatus, comprising a main rotary wheel adapted for rotation in association with the tape transportation, an auxiliary rotary wheel concentrical with said main rotary wheel and rotated in the same direction as said main rotary wheel irrespective of the tape transportation, and a mechanism adapted to axially move one or both of said main and auxiliary rotary wheels when the rotation of the main rotary wheel is stopped, wherein upon completion of the tape transportation, a lever or the like is moved by the axial movement of said main rotary wheel or said auxiliary rotary wheel through a switch or directly, thereby operating an automatic tape stopping mechanism.

A still further object of this invention is to provide a magnetic recording and reproducing apparatus, comprising a main rotary wheel adapted for rotation in association with the tape transportation, an auxiliary rotary wheel adapted for rotating at a lower peripheral speed than that of the main rotary wheel in the opposite direction to that of the main rotary wheel irrespective of the tape transportation, either one of the main and auxiliary rotary wheels being movable, and a movable roller rotatable in contact with said rotary wheels, wherein when the rotation of said one rotary wheel is stopped upon completion of the tape transportation, said roller is caused to intrude between the two rotary wheels by the rotation of the auxiliary rotary wheel so that said one rotary wheel is moved to stop or reverse the tape transport mechanism directly or through actuation of switch means.

A still further object of this invention is to provide a magnetic recording and reproducing apparatus, comprising a belt driven in association with the tape transportation, an auxiliary rotary wheel provided adjacent to the belt and rotated irrespective of said tape transportation at a lower peripheral speed than the speed of the belt in the opposite direction to that of the belt, and an intrusion roller rotatable and movable in contact with said auxiliary rotary wheel and said belt, wherein upon completion of the tape transportation, said belt is stopped, said intrusion roller is moved, and a detector mechanism is operated by the movement of said intrusion roller, whereby the tape transport mechanism is reversed or stopped.

A still further object of this invention is to provide a magnetic recording and reproducing apparatus, comprising an auxiliary rotary wheel provided in the neighborhood of the tape transported from a supply reel to a take-up reel and rotated, irrespective of the tape transportation, at a constant speed lower than the speed of the tape transportation in the opposite direction to that of said tape transportation, and an intrusion roller rotatable and movable in contact with said tape and said auxiliary rotary wheel, wherein when the tape has been completely wound on the take-up reel, the tape is stopped, and the intrusion roller is moved to operate a detector mechanism whereby the tape transport mechanism is reversed or stopped.

The novel features that are characteristic of this invention are set forth with particularity in the appended claims. The invention itself both as to its construction and operation, as well as additional objects and advantages thereof, will best be understood from the following description when read in connection with the accompanying drawings, in which:

Figure 1:
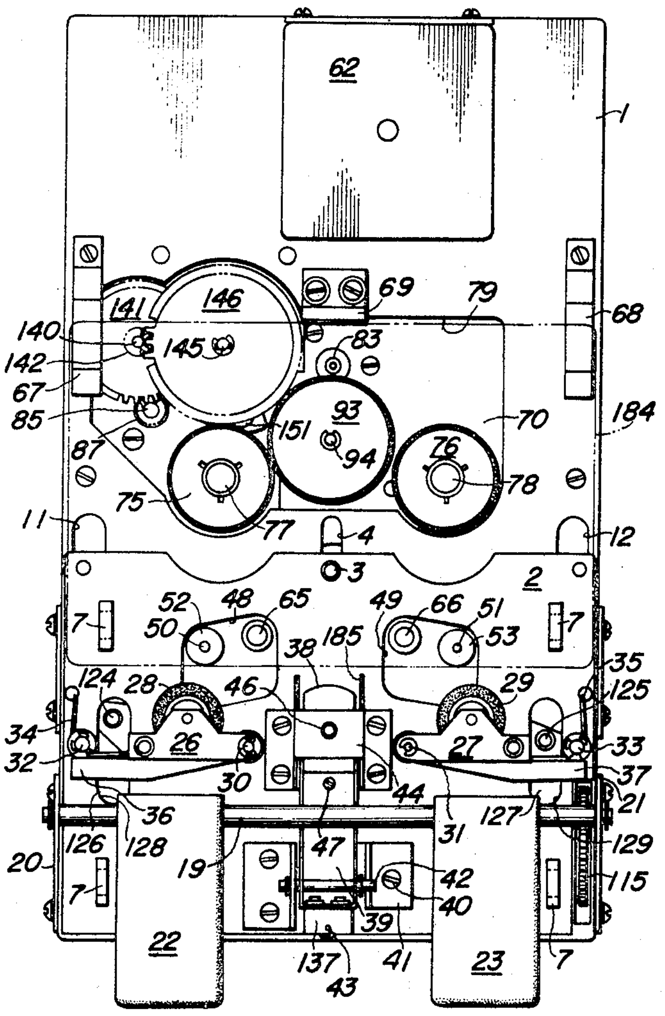
FIG. 1 is a top plan view of the magnetic recording and reproducing apparatus according to a first embodiment of this invention, showing the internal arrangement thereof as the apparatus is in the stop state.

With reference to FIGS. 1 to 22, description will first be made of the magnetic recording and reproducing apparatus according to a first embodiment of this invention. In the drawings, the reference numeral 1 represents a base plate, and 2 a slide plate provided on the base plate 1 in parallel relationship with the latter. The slide plate 2 is slidable longitudinally of the base plate 1, with a guide pin fixed to the slide plate 2 being inserted in an elongated aperture 4 formed in the base plate 1 and a guide pin 5 fixed to the base plate 1 being inserted in an elongated aperture 6 formed in the slide plate. Furthermore, the slide plate 2 has projections 7 provided in predetermined positions thereof each of which extends over a predetermined distance in the sliding direction of the slide plate 2 and has a roller ball 8 provided therein thereby enabling the slide plate 2 to be smoothly slid with respect to the base plate 1.

A guide pin collar 9 is secured to the end of the guide pin 3 fixed to the slide plate 2, and a washer 10 is secured to the end of the guide pin 5 fixed to the base plate 1, thus preventing the slide plate 2 from being slipped off from the base plate 1.

In the opposite side portions of the slide plate 2 are provided pins 13 and 14 which project downwardly through elongated apertures 11 and 12 formed in the base plate 1 respectively. On the reverse surface of the base plate 1, there are provided pins 15 and 16. Springs 17 and 18 are interposed between the pins 13 and 15 and between the pins 14 and 16, whereby the slide plate 2 is always pulled outwardly. To the opposite sides of the base plate 1 are fixed support plates 20 and 21 which are adapted for supporting an operating key shaft 19. A start key 22 and a stop key 23 are rotatably mounted on the key shaft 19. The key 22 is provided with a projection (not shown) adapted for engagement with a nail 24 provided on the slide plate 2, and the key 23 is provided with a projection (not shown) which is adapted to unlock a lock mechanism 25 for maintaining the slide plate 2 as it is when it is slid.

Thus, by depressing the key 22 to rotate it, its projection is placed into engagement with the nail 24 so that the slide plate 2 is slid inwardly against the resilient force of the springs 17 and 18, and the slide plate is maintained in the slidden state, which corresponds to the recording or playback state, by means of the lock mechanism 25.

In this state, by depressing the key 23 to rotate it, the lock mechanism 25 is unlocked by the projection of this key so that the slide plate 2 is returned to its original state, which corresponds to the stop state, by the springs 17 and 18.

In the central opposite side portions of the slide plate 2 are rotatably mounted pinch rollers 28 and 29 by means of brackets 26 and 27 which are rotatably supported by bracket shafts 30 and 31 fixedly provided on the slide plate 2, respectively.

Struts 32 and 33 are provided on the slide plate 2 outwardly sidewise of the pinch rollers 28 and 29, and springs 34 and 35 are provided on the struts 32 and 33, respectively. Each of the springs 34 and 35 has one end thereof fixed to the slide plate 2 and the other end thereof disposed in engagement with each of the brackets 26 and 27 thereby inwardly biasing each pinch roller 28 and 29. The brackets 26 and 27 have their outer end portions 36 and 37 disposed in contact with the struts 32 and 33 from the rear, thus restraining the inward rotation of the pinch rollers 28 and 29.

A head 38 is interposed between the pinch rollers 28 and 29 on the base plate 2. The head 38 is mounted on one end of a head elevating lever 39 the other end of which is rotatably attached to a support 41 through a shaft 42. The support 41 has one end thereof fixed to the slide plate 2 and the other end thereof attached to the side plate by means of a screw 40. A spring 43 is interposed between a spring receiving piece mounted on the rear end of the head elevating lever 39 and the slide plate 2, thereby always pushing the head 38 upwardly.

Since the support 41 on which the head elevating lever 39 is attached has one end portion thereof fixed and the other end attached to the slide plate by means of the screw 40, the support 41 is upwardly or downwardly inclined about the fixed portion thereof by turning the screw 40, and the head is moved integrally in accordance with the inclination of the support, whereby the inclination of the head 38 can be adjusted. On the slide plate 2, there are mounted a head cover 44 covering the opposite side faces and top face of the head 38 with a predetermined gap maintained between the head and the cover, and a platform 45 provided under the head 38 with a predetermined spacing maintained therebetween. A screw 46 is provided in the top surface of the head cover 44 in such a manner as to extend therethrough, and the lower end surface of the screw 46 determines the top position in height of the head 38 which is pushed upwardly by means of the spring 43. Also, a screw 47 is provided in the head elevating lever 39 in such a manner as to extend therethrough, and the lower end surface of the screw determines the bottom position in height of the head 38 when the latter is pushed downwardly as described later.

Thus, the top and bottom positions in height of the head 38 can be adjusted by turning the screws 46 and 47 to change the positions where the end surfaces of these screws contact the head 38 and platform 45.

On the base plate 1 are provided capstans 50 and 51 which are rotatably supported by bearings 52 and 53 and are projected out of holes 48 and 49 formed in the slide plate 2 in opposing relationship with the pinch rollers 28 and 29, respectively. Fly-wheels 54 and 55 are mounted on the lower end portions of the capstans 50 and 51 beneath the base plate 1, respectively. The capstans 50 and 51 are supported by stop plates 56 and 57 and thrust pads 58 and 59 fixedly secured to the base plate 1, so that the capstans 50 and 51 are prevented from being removed and can be smoothly rotated.

Pulleys 60 and 61 are provided on the fly-wheels 54 and 55 respectively, and a belt 64 is put on the pulleys 60 and 61 and a motor pulley 63 of a main motor 62 mounted on the base plate 1.

In the base plate 1 are planted guide pins 65 and 66 extending through the holes 48 and 49 of the slide plate 2 to position the cassette. Bed plates 67 and 68 on which the cassette is to be placed are provided on the base plate 1, and a leaf spring 69 adapted to impart a resilient force to the cassette is provided in opposing relationship with the guide pins 65 and 66.

A sub-base plate 70 is provided in the inner center portion of the base plate 1, and reel stand shaft struts 73 and 74 supporting reel stand shafts 71 and 72 (the strut 74 and shaft 72 are not shown) are mounted on the sub-base plate. Reel stands 75 and 76 and reel shafts 77 and 78 rotating integrally with the reel stands are rotatably mounted on the reel stand shafts 71 and 72 through a hole 79 formed in the base plate.

On the bottom surface of the sub-base plate 70 at a position which is equidistantly spaced apart from the reel stand shaft struts 73 and 74 are rotatably supported a driving roller shaft 81 by means of a bearing 82 through a frictional mechanism normally using a pulley 80.

A pulley shaft 85 having a pulley 84 mounted thereon is rotatably supported by a bearing 86 on the bottom surface of the sub-base plate 70 in the neighborhood of the reel stand 75, and a small gear 87 is mounted on the upper end of the pulley shaft 85.

A belt 88 is provided on the pulley 80, pulley 84 and motor pulley 63 of the motor 62.

A lever 89 of approximate L-shape is interposed between the sub-base plate 70 and the base plate, and it has the bent portion thereof rotatably attached to the sub-base plate 70 through a shaft 90. To the center portion of a piece 91 of the lever 89 which crosses the sliding direction of the slide plate 2 at a right angle thereto is rotatably attached, through a shaft 92, the center portion of an idler lever 95 having an idler 93 mounted on one end thereof through a shaft 94, the idler 93 which can be pressed against the driving roller 83 and the reel stand 75 or 76.

In the inner front end portion of another piece 96 of the lever 89, there is provided a projection which can be inclined so that its outer end portion is placed within the range of displacement of a guide pin collar 9 fixed to the guide pin 3 provided on the slide plate 2. The guide pin collar 9 is disposed in contact with the projection 97 when the slide plate 2 assumes the stop position. On the other hand, when the slide plate is slid, the guide pin collar 9 is placed out of contact with the projection 97 so that the lever 89 is rotated clockwise as described later.

On the base plate, there is provided a lever 99 which is rotatably supported at its center by a shaft 98. A spring 102 is provided over the shaft 98 of the lever 99, and it has its opposite end portions tending to approach toward each other retained at a projection 100 provided on one end of the lever 99 and a projection 101 provided on the other end of the idler lever 95.

In the reverse surface of the base plate 1 are planted guide pins 103 and 104 which are inserted in elongated apertures 105 and 106, respectively. Also, there is provided a slide lever 107 slidable perpendicularly with respect to the sliding direction of the slide plate, and the other end portion of the lever 99 is partly interposed between two arms 108 and 109 provided in the center portion of the slide lever 107.

A change-over auxiliary motor 110 is mounted within the base plate through a motor mount plate 111, and a changeover driving shaft 112 is placed below the slide lever 107 in parallel therewith. The shaft 112 is rotatably held by the base plate 1 and a bearing plate 113, and it is rotated by the motor 110 through a pinion gear 114 and a gear 115. A screw portion 116 is formed on the change-over drive shaft 112, and a nut 117 is threaded on the screw portion 116. The nut 117 is positioned between the arms 108 and 109 through which the change-over drive shaft 112 is loosely insetted, so that the nut is prevented from rotating.

Rotary levers 120 and 121 are rotatably provided on the reverse surface of the base plate 1 through shafts 118 and 119 respectively, and these levers are partly brought into contact with projections 122 and 123 provided in the opposite end portions of the slide lever 107 from the rear, respectively. Pins 124 and 125 are respectively planted in the rotary levers 120 and 121 and these pins are disposed in engagement with the outer end portions 36 and 37 of the bracket 26 holding the pinch rollers 28 and 29 from the side of the capstan 50 through holes 126 and 127 of the base plate 1 and holes 128 and 129 of the slide plate 2.

A stepped cam 130 is formed in one longitudinal end surface of the slide lever 107 through the central sloped side thereof, and a lever 132 is rotatably mounted on the base plate 1 through a shaft 131. A roller 133 rotatably provided on the front end or the lever 132 is disposed in contact with the stepped cam 130. An upwardly bent projection 134 of the lever 132 carrying the roller 133 has its front end placed in a hole 136 formed in the slide plate 2 through a hole 135 formed in the base plate 1.

The projection 134 is disposed in engagement with a leaf spring 138 superposed on a spring receiving plate 137 mounted on the rear end of the head elevating lever 39.

The small gear 87 mounted on the pulley shaft 85 intermeshes with a large gear 141 rotatably provided on a shaft 140 fixed to the sub-base plate 70 through fitting metal 139. A small gear 142 formed integrally with the large gear 141 intermeshes with a large gear 146 supported through a shaft 145 on a lever 144 rotatable with a bush rotatably fitted on the shaft 140.

A rotary wheel 147 pressed into a bush 186 is supported below the large gear 146 by a shaft 145 in such a manner that the rotary wheel can be rotated integrally with the large gear. Below the rotary wheel 147, a detecting lever 148 is rotatably supported at its center by the shaft 145, and the detecting lever is pressed against the bush 186 through a slip washer 149.

On one end of the detecting lever 148 is mounted a roller 151 which is placed in contact with the outer periphery of the rotary wheel 147 in the form of a planet and which is also placed in contact with the periphery of the reel stand 75.

A spring 152 is retained between the front end of the lever 144 and the L-shaped lever 89 to pull them. The lever 144 is prevented from rotation by a pin 153 which is fixed to the sub-base plate 70 in such a manner that the rotary wheel 147 and the reel stand are spaced apart from each other a distance slightly shorter than the diameter of the roller 151. Also, the lever 89 is restrained from rotation by the guide pin collar 9.

That peripheral surface of the pin 153 which the lever 144 contacts is made eccentric with respect to the portion mounted to the sub-base plate 70. Thus, by turning the pin 153, it is possible to adjust the position where the lever 144 is brought into contact with the pin 153 to be stopped, that is, the spacing between the rotary wheel 147 and the reel stand 75.

The design is made such that the peripheral speed $V_1$ of the rotary wheel 147 rotated through the aforementioned gear group becomes slightly lower than the minimum peripheral speed $V_2$ of the reel stand 75.

On the base plate 1 are mounted a main switch 154 adapted to be closed when the slide plate 2 is slid by manipulating the key 22, a detecting switch controlled by the detecting lever 148 which is rotated through the rotation of the roller 151, and a change-over switch 156 controlled through the movement of the slide lever 107.

The main switch 154 consists of a movable contact 157 and the detecting switch 155 consists of a movable contact 159 and two fixed contacts 160 and 161, the movable contact 159 being switchingly brought into contact with the two fixed contacts 160 and 161. The change-over switch 156 consists of two contact groups 162 and 163. The contact group 162 includes two movable contacts 164 and 165 and three fixed contacts 166, 167 and 168, the movable contact 164 being switched from the fixed contact 166 to the fixed contact 167, and the other movable contact being switched from the fixed contact 167 to the fixed contact 168.

The contact group 163 consists of a slide switch having movable contacts 169 and 170 and fixed contacts 171, 172 and 173 as is the case with the contact group 162. The contact group 163 is in interlocking relationship with the contact group 162, so that the movable contact is switched from the fixed contact 171 to the fixed contact 172 and the movable contact 170 is switched from the fixed contact 172 to the fixed contact 173. When reversely switched, these switches are returned to their original positions.

Description will now be made of the connections between the respective switches 154, 155 and 156 and the motors 62 and 110. Across a power source 174 is connected a series circuit consisting of the fixed contact 160 and movable contact 159 of the detecting switch 155, the fixed contact 158 and movable contact 157 of the main switch 154, the motor 62, and the movable contact 165 and fixed contact 167 of the change-over switch 156. The motor 110 is connected between the movable contact 159 of the detecting switch 155 and the movable contact 164 included in the contact group 162 of the change-over switch 156. The fixed contacts 166 and 168 of the change-over switch 156 are connected with the fixed contact 160 of the detecting switch 155.

Figure 21:
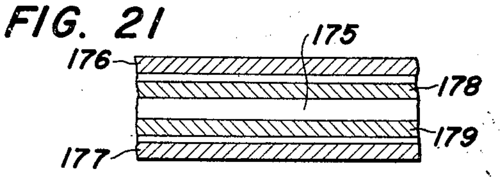
FIG. 21 is a view showing the channel and track arrangement on the tape.

The contact group 163 of the change-over switch 156 serves to switch the left and right speaker circuits in an attempt to achieve the channel selection in a stereophonic magnetic recording and reproducing apparatus. Since the cassette must be turned over to reproduce different channels when a tape 175 is completely taken up, one common magnetic head scans the tape 175 to form a first track 176 and a fourth track 177 in the upper and lower edge portions of the tape, and another common magnetic head scans the tape to form a second track 178 and a third track 179 between the first and fourth tracks 176 and 177, as shown in FIG. 21. Thus, the left and right playback sounds produced by the speakers are reversed if the automatic reversal of tape transportation is effected.

In order to solve the problem of the left and right reversal of play-back sounds produced by the speakers, the contact group 163 is inserted between two electric circuit systems such as a pre-amplifier 180 having a stereophonic head assembly 38 connected with the input thereof and a main amplifier 183 adapted for driving speakers 181 and 182. In this way, the two amplifier circuits are switched each other in the channel selection.

The reference numeral 184 represents a cassette, and the reference numeral 185 denotes a tape guide which is provided on the head cover for the purpose of enabling the tape 175 in the cassette 184 to be transported at a predetermined height with respect to the head 38.

Next, description will be made of the operation of the present apparatus having the aforementioned construction.

Figure 2:
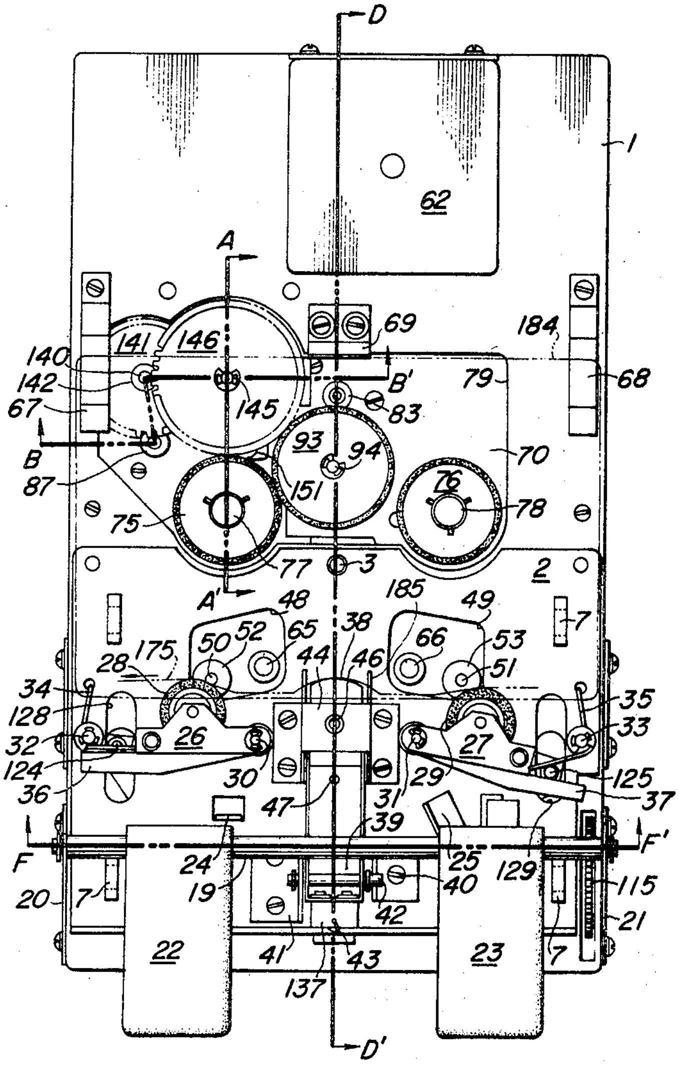
FIG. 2 is a top plan view of the apparatus of FIG. 1, showing the internal arrangement thereof as it is in the playback state.
Figure 3:
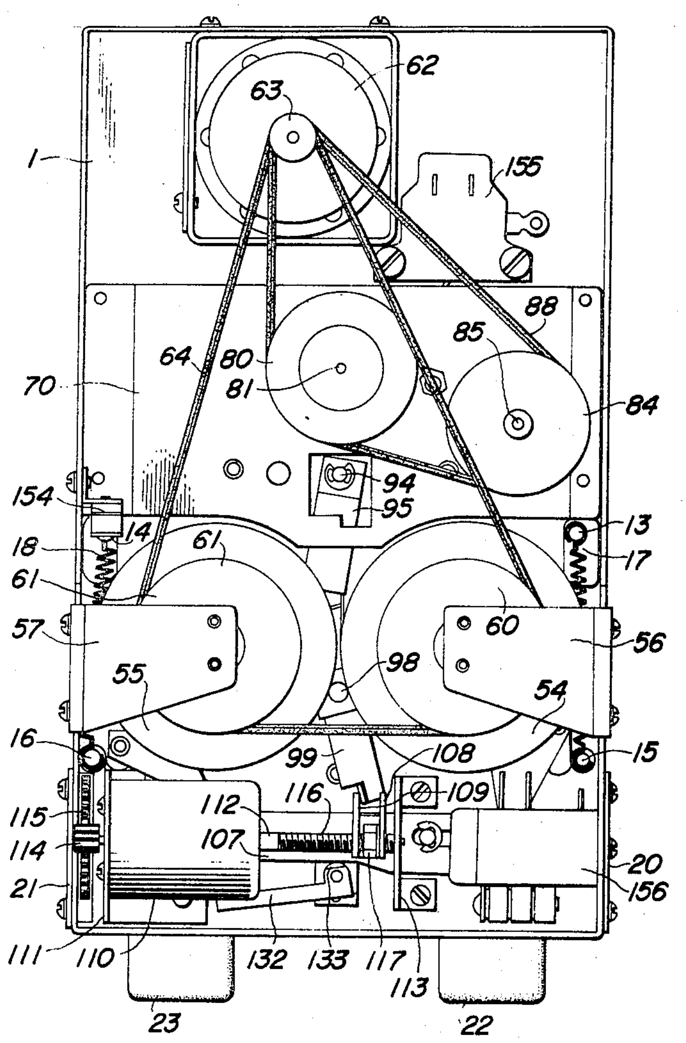
FIG. 3 is a bottom plan view of FIG. 2.
Figures 6, 7:
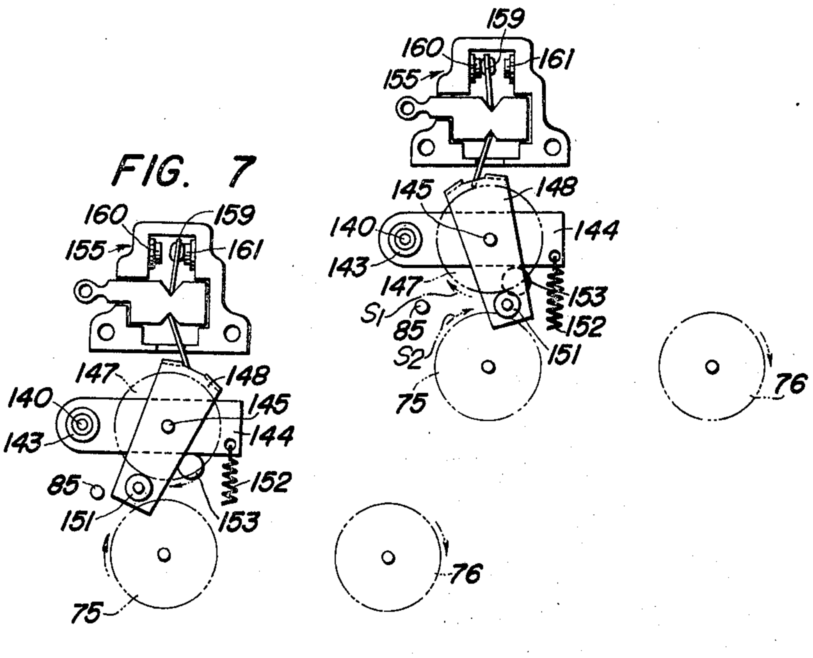
FIGS. 6, 7, 8 and 9 are top plan views illustrating the operations of the mechanism for detecting the completion of the tape transportation, taken along line C—C′ of FIG. 4, respectively.
Figures 8, 9:
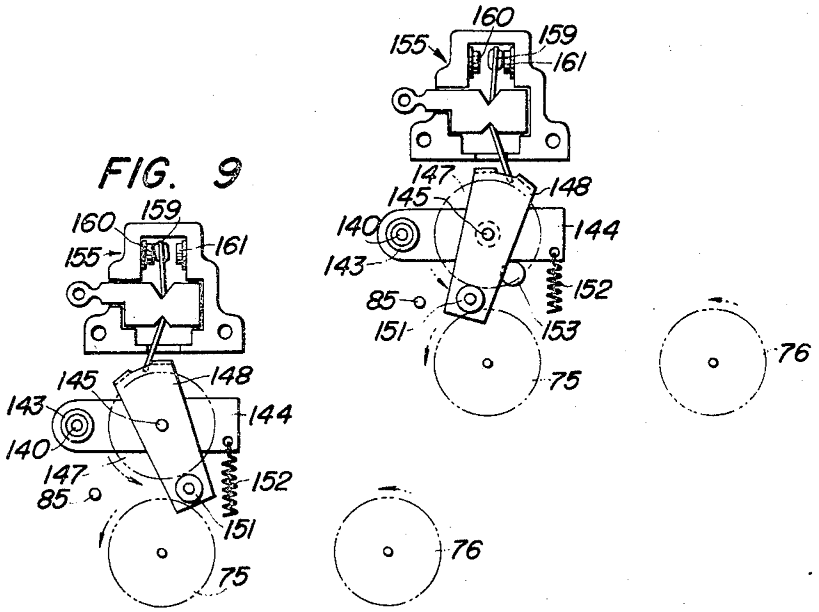
Figure 10:
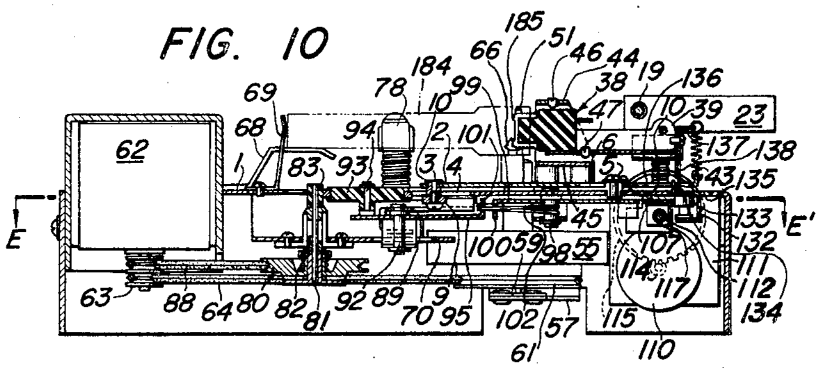
FIG. 10 is a sectional view taken along line D—D′ of FIG. 2.

First, in the stop state, the slide plate 2 is pulled by the springs 17 and 18 so as to be kept stationary in the rear, as shown in FIG. 1. The roller 151 is displaced by the reel stand 75 and the rotary wheel 147 so as to assume two stop positions, as will be described later. In this embodiment, however, there is disclosed a system in which the previous stop position is maintained when the operation of the apparatus is started, that is, a system in which the tape starts to be transported in the same direction as that in which it had been transported before it was stopped. The movable contact 159 of the detecting switch 155 is engaged with either one of the fixed contacts 160 and 161 depending upon the position of the roller 151. The slide lever 107 has been slid either leftward or rightward by the motor 110. Thus, the movable contacts 164, 165, 169 and 170 of the change-over switch 156, the idler 93, the pinch rollers 28 and 29 and the head 38 which are operated in response to the slide lever 107 are adapted to assume either one of their change-over positions. The positions of the slide lever 107, the associated mechanism, the switches and the like are as shown in FIGS. 1, 6, 11, 14, 18, 19 and 22, when the roller 151 assumes the position as shown in FIGS. 1, 2 and 6, that is, when the tape is being transported to the left or the tape is stopped during the leftward transportation thereof.

Figures 14, 15, 16, 17:
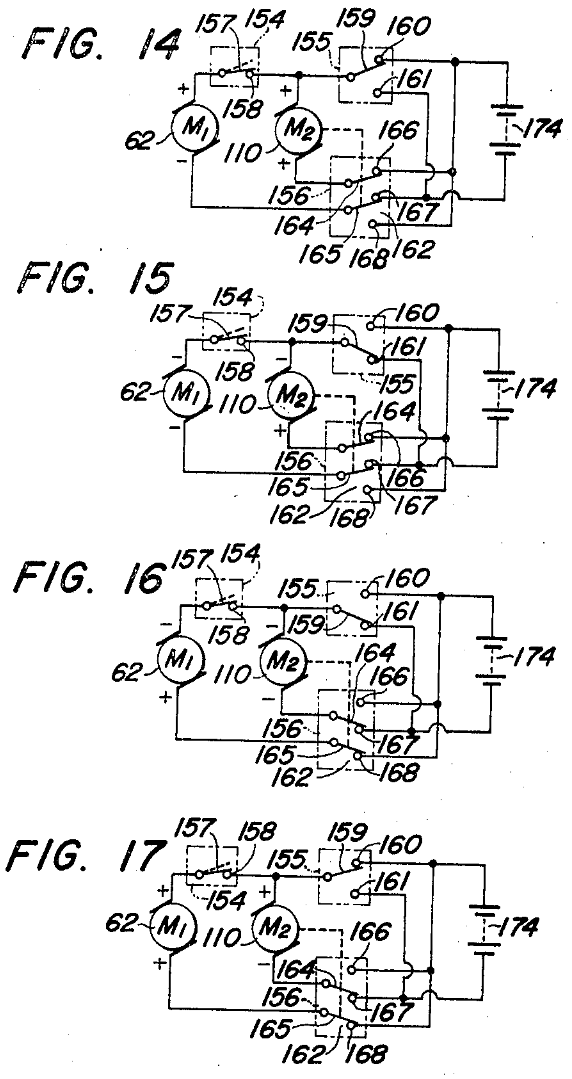
FIGS. 14, 15, 16 and 17 are circuit diagrams showing the driving states of the motors, respectively.
Figure 18:
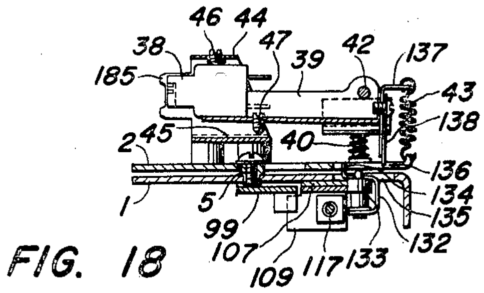
FIGS. 18, 19 and 20 are sectional views corresponding to FIG. 10, showing how the channel selection is effected with respect to the head, respectively.

In such stop state, by inserting the capstans 50 and 51 and the reel shafts 77 and 78 in the cassette 184 with the position and height of the latter determined by the guide pins 65 and 66, the bed plates 67 and 68 and the leaf spring 69, and by sliding the slide plate 2 toward the reel stands 75 and 76 against the resilient forces of the springs 17 and 18 by means of the key 22, the pinch rollers 28 and 29 and head 38 are inserted in the cassette 184, and simultaneously the main switch 154 is closed to establish such a motor circuit as shown in FIG. 14, so that the motor starts rotation.

The slide plate 2 is retained by the lock mechanism 25 while the pinch rollers 28 and 29 and the head 38 are inserted in the cassette 184, and such condition is maintained.

Due to the fact that the slide lever 107 has been displaced leftward and stopped at the leftward position, the rotary lever 120 is kept substantially in place by the projection 122 of the slide lever 107. The rotary lever 121 is rotated by the projection 123 so that pin 124 of the lever 120 is advanced toward the reel stand 75 and the pin 125 of the lever 121 is behind the pin 124. This will be readily apparent if the positions of the pins 124 and 125 are compared. The bracket 26 of the pinch roller 28 is biased by the spring 34 when the slide plate is slid. Consequently, the bracket 26 is moved together with the slide plate 2 while the apparatus is assuming such stop state as shown in FIG. 1.

On the other hand, the bracket 27 of the pinch roller 29 is retained by the pin 125 when the slide plate 2 is slid, so that the outer end portion 37 thereof is rotated about the bracket shaft 31 against the resilient force of the spring 35. Thus, the pinch roller 29 is kept apart from the capstan 51 even when the slide plate 2 is slid and retained in place.

The lever 99 is rotated rightward by the arms 108 and 109 of the slide lever 107 and stopped at the position, so that the idler lever 95 is rotated to the left by the spring 102 when the slide plate 2 is slid to dispose the guide pin collar 9 out of engagement with the projection 97 of the lever 89. Thus, the idler 93 is pressed against both the reel stand 75 and driving roller 83.

By the fact that the idler 93 is interposed between the reel stand 75 and the driving roller 83 and the pinch roller 28 is pressed against the capstan 50 through the tape 175, the drive roller 83 is driven and at the same time the capstan is driven, with the result that the tape is transported to be wound onto the reel on the reel stand 75. In this way, the playback condition can be established.

Figure 19:
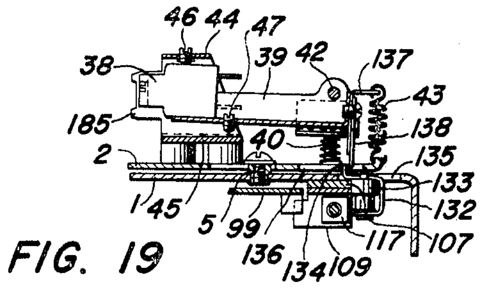
Figure 20:
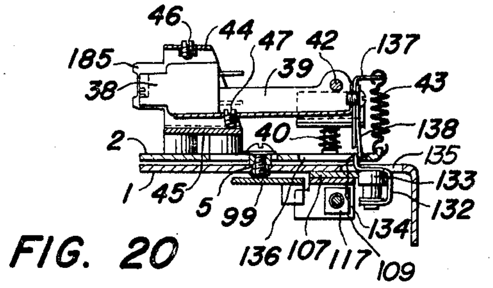

When the slide lever 107 has been displaced to the left, the roller 133 is disposed in engagement with the recess of the stepped cam 130 formed in the lever 107. Therefore, when the slide plate has been slid, the projection 134 of the lever 132 is opposed to the leaf spring 138 with a slight spacing maintained therebetween, as shown in FIG. 19. Consequently, the head elevating lever 39 is pulled by the spring 38, and the head 38 is retained by the screw 46 to scan the upper channels or tracks 176 and 178 of the tape 175.

Figure 4:
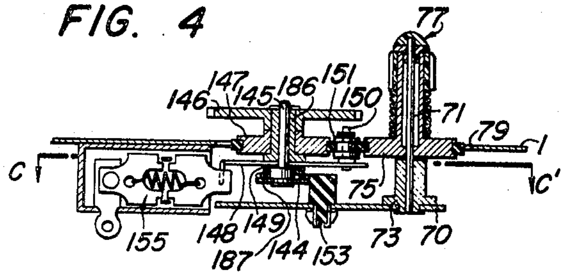
FIG. 4 is a sectional view of the mechanism for detecting the termination of the tape transportation, taken along line A—A′ of FIG. 2.
Figure 5:
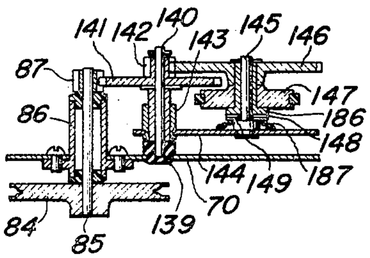
FIG. 5 is a sectional view of the rotary wheel driving portion, taken along line B—B′.
Figure 11:
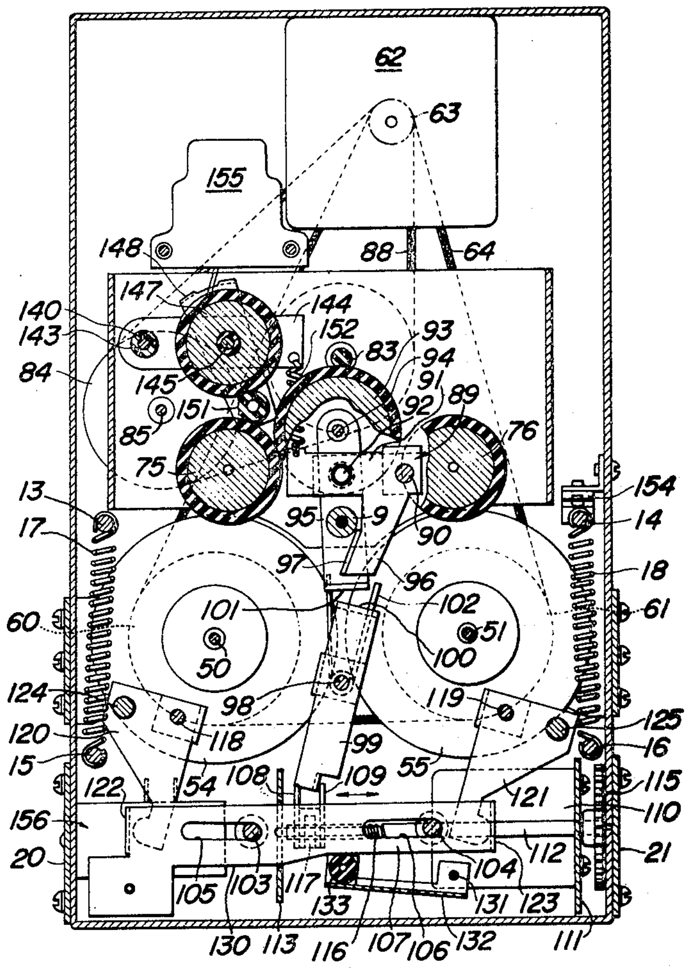
FIG. 11 is a sectional view taken along line E—E′ of FIG. 10.
Figure 12:
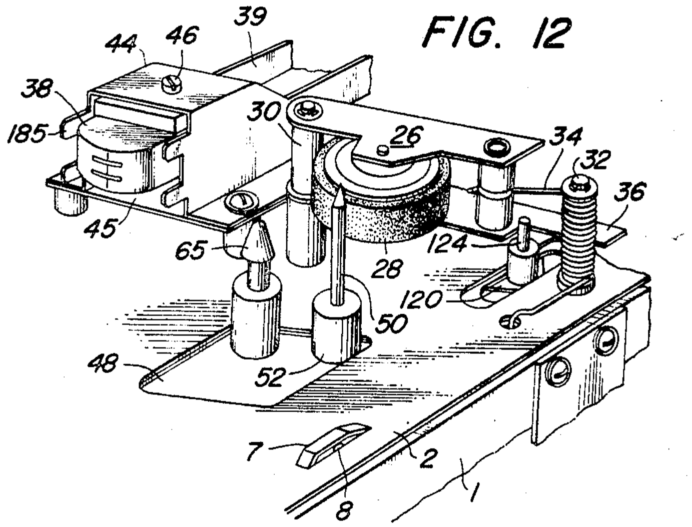
FIG. 12 is an enlarged perspective view showing one of the tape driving portions.
Figure 13:
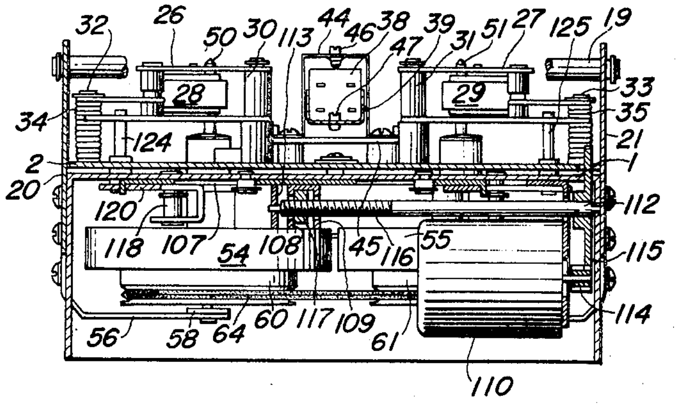
FIG. 13 is a sectional view taken along line F—F′ of FIG. 2.

In the playback state the tape 175 is being wound onto the reel on the reel stand 75, the detecting lever 148 is frictionally rotated by a rotary wheel bush 186 through such an arrangement as shown in FIG. 4 to rotate the roller 151 in such a direction as to insert it between the reel stand 75 and the rotary wheel 147 so that the roller is lightly pressed against the reel stand 75 and the rotary wheel 147. However, due to the fact that the peripheral revolutionary speed $V_2$ of the reel stand 75 is made higher than that $V_1$ of the rotary wheel 147, a rotating force is imparted to the intruding roller 151 interposed between the rotary wheel 147 and the reel stand 75. That is, the rotating force based on the speed difference $V_2-V_1$ is imparted to the roller 151 so that the latter is idly rotated in the opposite direction as that of the rotation of the reel stand 75, as shown in FIGS. 6 and 11. Accordingly, the introducing roller 151 is not intruded between the reel stand 75 and the rotary wheel 147.

The above operation is effected in the playback state in which the tape is transported toward the reel stand 75.

Upon completion of the tape take-up on the reel stand 75, a tensile force is imparted to the tape 175 since the terminating end of the tape is fixed to the reel in the cassette 184. Thus, the tape transportation is stopped. In such state, although the capstan 50 and pulley 80 are still rotating, the reel stand 75 is stopped from rotating since the driving roller shaft 81 is rotated by the pulley 80 through a frictional mechanism.

Even if the rotation of the reel stand 75 is stopped, the rotary wheel 147 is still rotating. Therefore, when the rotation of the reel stand 75 is stopped, only the rotating force of the rotary wheel 147 is imparted to the roller 151 which has been idly rotating, with the result that the roller is displaced to such a position between the rotary wheel 147 and the reel stand 75 as shown in FIG. 7. That is, the intruding roller 151 is displaced between the rotary wheel 147 and the reel stand 75 while pushing away the rotary shaft 147 against the resilient force of the spring 152 biasing the rotary wheel 147, and the force is still imparted to the roller in the direction of rotation of the rotary wheel 147 in such a state that the roller has been displaced. Thus, the idler is placed at the position as shown in FIG. 7.

If the roller 151 is displaced from the position as shown in FIG. 6 to the position as shown in FIG. 7, the detecting lever 148 on which is mounted the roller 151 is simultaneously rotated about the shaft 145. The rotation of the detecting lever 148 causes the movable contact 159 of the detecting switch 155 to be switched so that the power supply circuit for the motor 62 is cut off. Simultaneously the power source 174 is connected with the motor 110 to establish the power supply circuit for the latter as shown in FIG. 15, so that the motor 110 starts rotating.

When the motor 110 starts rotating, the change-over drive shaft 112 is rotated so that the nut 117 threaded on the screw portion 116 of the change-over drive shaft 112 is displaced to the right and it contacts the arm 109. The nut 117 is further moved in contact with the arm 109, and thus the slide lever 107 is also moved to the right. As a result, the rotary lever 120 in contact with the projection 122 of the slide lever 107 is rotated to the left, and the pin 124 rotates the bracket 36 of the pinch roller 28 against the resilient force of the spring 34 in such a direction as to separate the pinch roller 28 from the capstan 50.

On the other hand, the rotary lever 121 in contact with the projection 123 of the slide lever 107 is released from the rightward rotation effected against the resilient force of the spring 35 as the slide lever 107 is moved to the right, and thus it is rotated with the leftward rotation of the bracket 27 effected due to the resilient return of the spring 35. Consequently, the pinch roller 28 is separated from the capstan 50, and now the pinch roller 29 is pressed against the capstan 51 by the spring 35.

The rightward movement of the arms 108 and 109 due to the rotation of the change-over drive shaft 112 results in the leftward rotation of the lever 99, so that the lower end portion of the idler lever 95 having the idler 93 mounted thereon is pushed to the left by the right end portion of the spring 102 having such a resilient return that the opposite ends thereof tend to approach toward each other. Thus, the idler lever 95 is rotated to the right so that the slide lever 107 is moved to the right. In the reversed state as described later, the idler lever 95 and lever 99 are positioned symmetrically with respect to a line passing through the shafts 92 and 98 as shown in FIG. 11, so that the idler 93 is separated from the reel stand 75 and now pressed against the reel stand 76 while being in contact with the driving roller 83.

The rightward displacement of the slide lever 107 causes roller 133 to ride on the stepped cam 130 of the slide lever 107. Thus, lever 132 is rotated to the left so that a projection 134 of the lever 132 is moved rightward as viewed in FIG. 19. As a result the projection is brought into contact with leaf spring 138 attached to the head elevating lever 39 to cause the lower end of the leaf spring 138 to be further displaced to the right and bent against the resilient force of the spring 43. In this case, the resilient force of the spring 43 is overcome by that of the leaf spring 138 thus bent, so that the force end of the head elevating lever 39 is pushed downwardly. Thus, the head 38 is lowered and its height is determined when the screw 47 is placed in contact with the bed plate 45. Such state will be maintained until the roller 133 is released from riding on the stepped cam 130.

Being lowered as described above, the head 38 now scans the lower channels or the third and fourth tracks 179 and 177 on the tape 175.

Figure 22:
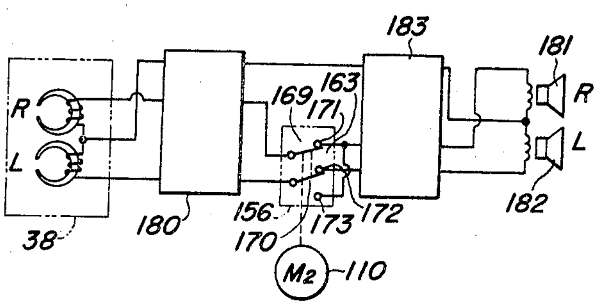
FIG. 22 is a circuit diagram showing how the electric circuit is switched in correspondence with the channels and tracks on the tape as shown in FIG. 21.

The rightward displacement of the slide lever 107 also causes the movable contacts 164 and 165 in the contact group 162 and the movable contacts 169 and 170 in the contact group 163 of the change-over switch 156 to be switched. That is, the movable contact 164 is switched to the fixed contact 167, and the movable contact 165 to the fixed contact 168 as shown in FIGS. 16 and 22, whereby the power supply circuit for the motor 110 is cut off with the result that the rightward displacement of the slide lever 107 is stopped. In this case, the power supply circuit for the motor 62 is established so that a voltage opposite in polarity to the case of FIG. 14 is supplied from the power source 174 to the motor 62 to reversely rotate the latter.

On the other hand, the movable contact 169 is switched to the fixed contact 171, and the movable contact 170 to the fixed contact 172, so that the output of the preamplifier is reversely connected with the input of the main amplifier 183. Thus, in spite of the fact that the right and left channels on the tape 175 are reversed in position, playback sounds are properly produced by the speakers 181 and 182.

When the motor 62 is reversely rotated, the intruding roller 151 stopped at the position as shown in FIG. 7 is slightly moved to a position where it contacts the rotary wheel 147 and reel stand 75 by the reverse rotation of the rotary wheel 147 in the rotating direction of the latter. Thereafter, a force based on the peripheral speed $V_2-V_1$ is imparted to the roller 151 so that the roller 151 is rotated in the reverse direction of the rotation of the take-up reel stand 75.

As described above, the respective change-over mechanism portions are switched by the fact that the rotation of the reel stand 75 is stopped, so that the power source 174 is connected in reverse polarity with the motor 62 to reverse the rotation of the latter. In this way, the tape 175 is transported toward the reel stand 76 to be wound onto the reel thereon so that the lower channels on the tape 175 are reproduced.

When the tape 175 is completely wound from the reel on the reel stand 76, that is, when the reel on the reel stand 75 is emptied of the tape, the reel stand 75 is again stopped since the end portion of the tape 175 is fixed to the reel shaft in the cassette 184. Thus, a force in the direction of rotation of the rotary wheel 147 is imparted to the intruding roller 151 so that the latter is moved from the position shown in FIG. 8 to the position shown in FIG. 9, as in the above case. As a result, the detecting switch 155 is switched to the original position as shown in FIG. 17, so that the power supply circuit for the motor 62 is cut off and simultaneously the power supply circuit for the motor 110 is established. The slide lever 107 is returned to the original position as shown in FIG. 11. Thus the pinch roller 29 is placed out of engagement with the capstan 50. The idler 93 is pressed against the reel stand 75. Head 38 is pushed upwardly. The change-over switch 156 is switched so that the power supply circuit for the motor 62 is established in the form of the circuit arrangement as shown in FIG. 14. In this way, the tape 175 is transported toward the reel stand 75 to be wound onto the reel thereon. At this time, the intruding roller 151 is returned from the position of FIG. 9 to the position of FIG. 6, and a force based on the peripheral speed $V_2-V_1$ is imparted to the roller so that reel stand 75 and the roller 151 is rotated in the reverse direction each other in view of the center of the axis.

In this state, the upper channels on the tape 175 are again reproduced. Thus, the automatic reverse playback of the cassette 184 becomes possible.

A second example of the apparatus according to this invention will be described with reference to FIGS. 23 to 26. In these figures, the reference numerals 201 and 202 represent a supply reel stand and a take-up reel stand which are rotatably provided on a base plate 203 through shafts 205, with a predetermined spacing maintained therebetween, respectively. The reference numeral 206 denotes a pulley rotatably mounted on the shaft 205 below the take-up reel stand 202, 207 a slip member interposed between the pulley 206 and the take-up reel stand 202, and 208 a coil spring provided under the pulley 206 and having the shaft 205 inserted therethrough thereby always pushing the pulley 206 toward the take-up reel stand 202.

The reference numeral 209 indicates a follower roller which is rotatably provided on a shaft in the neighborhood of the take-up reel stand 202, 211 a pulley provided below the follower roller 209, and 212 an auxiliary roller rotatably supported by a shaft 213 at a position where the roller 212 contacts the outer periphery of the follower roller 209. The reference numeral 214 represents a rotary lever provided below the auxiliary roller 212 and rotatably mounted on the shaft 213 of the auxiliary roller 212 at a position slightly deviated from the center to one end thereof. The reference numeral 215 denotes a roller formed of a soft material such as rubber or the like and which is rotatably provided in the opposite end portion of the rotary lever 214 through a shaft 216. The one end of the rotary lever 214 is pulled by a spring so that the outer periphery of the roller 215 is in contact with those of the take-up reel stand 202 and the auxiliary roller 212 usually at a position deviated from the line passing through the shaft 205 of the take-up reel stand 202 and the shaft 213 of the auxiliary roller 212.

The reference numeral 218 indicates a switch having a contact position 219 positioned in the neighborhood of the one end of the rotary lever 214. The switch 218 is closed through engagement of the one end portion of the rotary lever 214 with the contact portion 219 when the rotary lever 214 is rotated.

The reference numeral 220 denotes a capstan which is rotated by a driving source such as motor or the like, and 221 a roller rotatably provided on a shaft 222 to be pressed against the capstan 220.

The reference numeral 223 represents a pulley integral with the roller 221 and 224 a belt running around the follower roller 209 and pulley 221. Part of the folded-back portion of the belt 224 is disposed in contact with the pulley 206 provided below the take-up reel stand 202.

Description will now be made of the operation of this embodiment. When a tape (not shown) placed on the supply and take-up reel stands 201 and 202 is transported from the supply reel stand 201 to the take-up reel stand 202, that is, when the take-up reel stand 202 is rotated by the belt 224 running around the pulley 223 of the roller 221 in contact with the capstan 220 through the friction of the slip member 207, the auxiliary roller 212 is also rotated by the follower roller 209. In this case, the peripheral speed of rotation of the take-up reel stand 202 is made higher than that of the auxiliary roller 212.

Assuming that the peripheral speed of the take-up reel stand 202 is $V_1$, and that the peripheral speed of the auxiliary roller 212 is $V_2$, then a force based on the peripheral speed $V_1-V_2$ is imparted to the roller 215 so that the latter is idly rotated in the direction of rotation of the take-up reel stand 202.

Upon completion of the tape take-up operation, a tensile force is applied to the tape since the terminating end of the tape is fixed to the supply reel. Thus, the tape transportation is ceased. In such state, the capstan 220 is still being rotated to rotate the pulley 206 provided below the take-up reel stand 202 through the belt, while the rotation of the take-up reel stand 202 is stopped by the slip member 207 interposed between the pulley 206 and the take-up reel stand 202.

Figure 23:
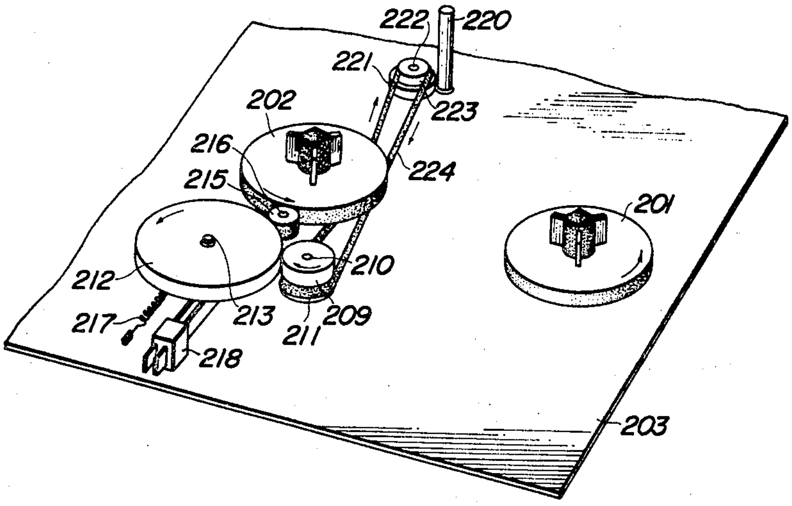
FIG. 23 is a perspective view showing the major portion of the magnetic recording and reproducing apparatus according to a second embodiment of this invention.
Figure 24:
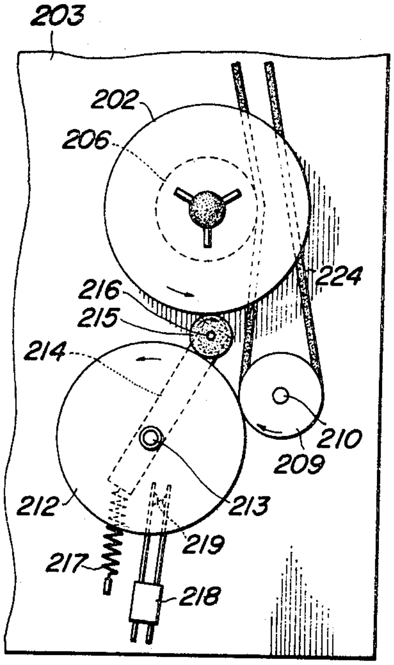
FIG. 24 is a top plan view showing part of the major portion as shown in FIG. 23.
Figure 25:
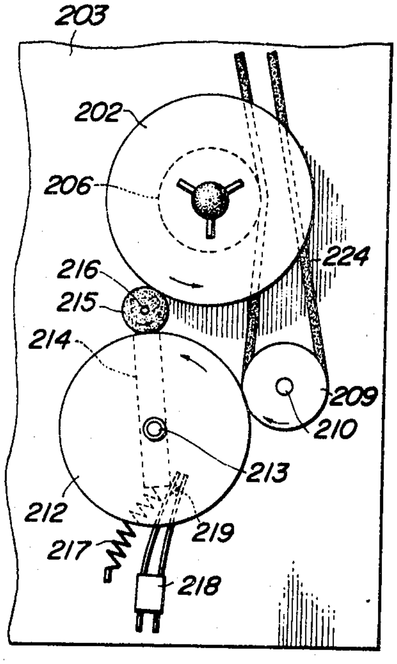
FIG. 25 is a top plan view partially showing the operating state of said major portion.
Figure 26:
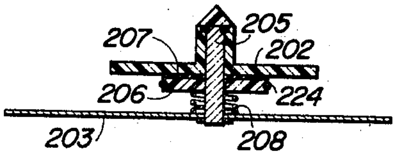
FIG. 26 is a sectional side view showing the take-up reel stand portion of the magnetic recording and reproducing apparatus as shown in FIG. 23.
Figure 27:
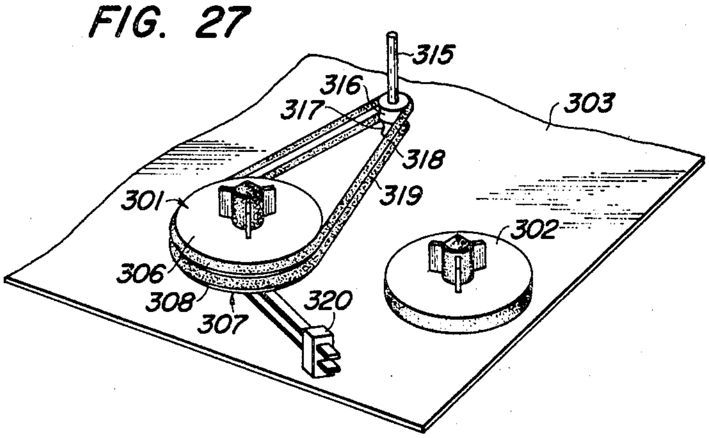
FIG. 27 is a perspective view showing the major portion of the magnetic recording and reproducing apparatus according to a third embodiment of this invention.
Figure 28:
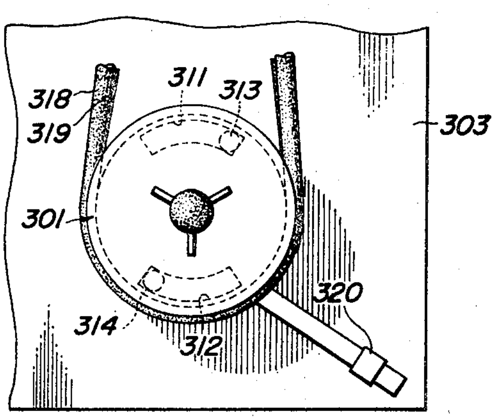
FIG. 28 is a top plan view showing part of the major portion as shown in FIG. 27.
Figure 29:
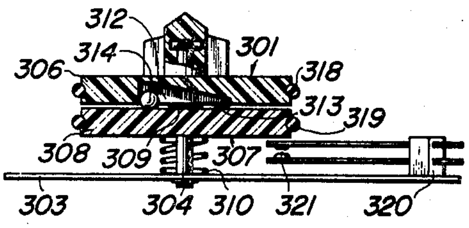
FIG. 29 is a longitudinal sectional view of FIG. 28.

During the rotation of the capstan 220, the auxiliary roller 212 is also being rotated. Therefore, when the rotation of the take-up reel stand 202 is stopped, the roller 215, which has been idly rotating at the position as shown in FIG. 23, intrudes between the auxiliary roller 212 and the take-up reel stand 202 so as to be moved in the direction of rotation of the auxiliary roller 212 as shown in FIG. 25.

The movement of the intrusion roller 215 results in the rotation of the rotary lever 214 having the roller 215 per se mounted thereon. Thus, one end portion of the rotary lever 214 is brought into contact with the contact portion 219 of the switch 218 to close this switch. By closing the switching 218, it is possible to stop the driving source rotating the capstan 220, to operate the automatic stop mechanism, or to reverse the rotation of the driving source to reverse the direction of the tape transportation.

Although, in the foregoing, description has been made of the case where the switch 218 is switched from an open state to a closed state by the rotary lever 214, the related mechanism can be similarly operated even if the switch is designed to be reversely switched. It is also possible to operate directly mechanically the automatic reversing mechanism and the other mechanism through the movement of the rotary lever 214.

In the foregoing, description has been made of the case where the automatic reversing mechanism and the other mechanism are operated by stopping the rotation of the take-up reel stand 202. However, a similar operation can be performed by such a structure that the rotary lever is rotated by stopping the rotations of the supply reel stand 201, a pinch roller (not shown) of which the rotation is stopped when the tape transportation is stopped, a separate roller adapted to be rotated integrally with the supply reel stand 201 and the pinch roller, a belt and the like. Alternatively, use may be made of such a structure that the intrusion roller 215 is formed of a hard material and a soft material is provided in the outer peripheries of the take-up reel stand 202 and the auxiliary roller 212.

Next, a third example of the magnetic recording and reproducing apparatus according to this invention will be described with reference to FIGS. 27 to 30. In these figures, the reference numerals 301 and 302 represent a takeup reel stand and a supply reel stand rotatably provided on a base plate 303 through a shaft 304, with predetermined spacing maintained therebetween. The reference numeral 306 denotes a pulley formed in the outer periphery of the take-up reel stand 301, and 307 and auxiliary roller mounted on the shaft 304 below the take-up reel stand 301 in such a manner that it can be rotated independently of the take-up reel stand 301, the diameter of the auxiliary roller being equal to that of the take-up reel stand 301. The reference numeral 308 indicates a pulley formed in the outer periphery of the auxiliary roller 307, 309 a retainer flange provided on the shaft 304 for the purpose of maintaining a predetermined spacing between the bottom surface of the take-up reel stand 301 and the top surface of the auxiliary roller 307, and 310 a coil spring interposed between the base plate 303 and the bottom surface of the auxiliary roller 307 with the shaft 304 inserted therethrough. The coil spring 310 always pushes the auxiliary roller 307 toward the take-up reel stand 301 so that the auxiliary roller 307 may be retained at the flange 309.

The reference numerals 311 and 312 represent wedge-shaped recess grooves formed in the bottom surface of the take-up reel stand 301 at positions slightly inward of the outer periphery thereof in opposing relationship with each other about the shaft 304. Each of the grooves 311 and 312 is made gradually deeper from one end toward the other end thereof. The reference numerals 313 and 314 denote steel balls placed in the deep portions of the grooves 311 and 312, the diameter of each ball being slightly smaller than the distance between the upper surface of the deep groove portion and the upper surface of the auxiliary roller 307. The reference numeral 315 represents a capstan rotated by a driving source such as a motor or the like, and 316 and 317 pulleys formed in the lower portion of the pulley 316, the diameter of the pulley 316 being larger than that of the pulley 317.

The reference numerals 318 and 319 represent a belt running between the pulley 316 and the pulley 306 of the take-up reel stand 301 and a belt running between the pulley 317 and the pulley 308 of the auxiliary roller 307, respectively. The reference numeral 320 indicates a switch which is closed when a movable contact is depressed into contact with a contact 321. The switch 320 is mounted on the base plate 303 with the contact portion 321 being positioned below the auxiliary roller 307.

Description will now be made of the operation of this embodiment. When a tape (not shown) placed on the take-up reel stand 301 and the supply reel stand 302 is transported from the supply reel stand 302 to the take-up reel stand 301, that is, when the rotation of the capstan 315 is transmitted to the take-up reel stand 301 and the auxiliary roller 307 through the belts 318 and 319 so that the take-up reel stand 301 and the auxiliary roller 307 are rotated, the speed of rotation of the take-up reel stand 301 is higher than that of the auxiliary roller 307.

A force based upon the difference between the speed of rotation of the take-up reel stand 301 and that of the auxiliary roller 307 is imparted to the steel balls 313 and 314 in the direction of the speed difference since the speed of rotation of the take-up reel stand 301 is slightly higher than that of the auxiliary roller 307. The direction of the force liferated on the balls 313 and 314 acts from the shallow portion to the deep portion of grooves 311 and 312. Therefore, each of the steel balls 313 and 314 is idly rotated in the deep portion of each groove 311 and 312.

Figure 30:
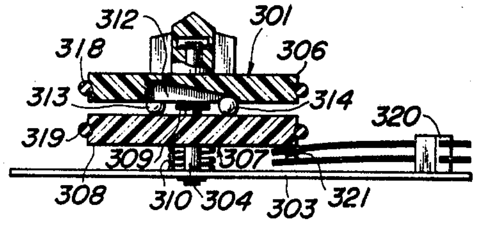
FIG. 30 is a longitudinal sectional view showing the operating state of the major portion.
Figure 31:
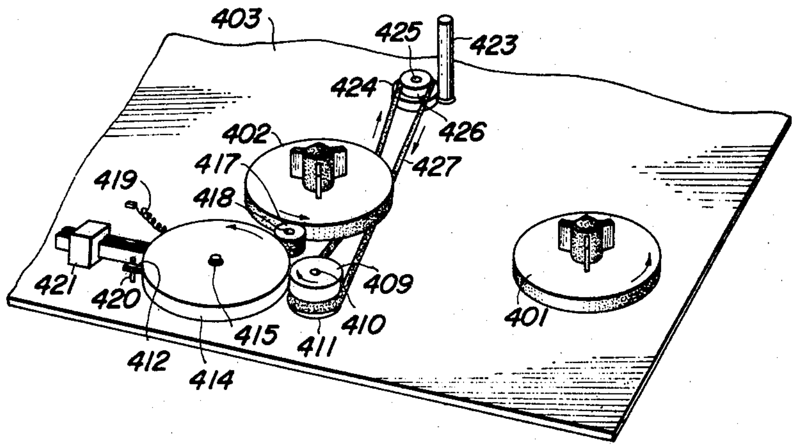
FIG. 31 is a perspective view showing the major portion of the magnetic recording and reproducing apparatus according to a fourth embodiment of this invention.

Upon completion of the tape take-up operation, the tape transportation is stopped since the terminating end of the tape is fixed to the supply reel so that a tensile force is imparted to the tape to stop the rotation of the take-up reel stand 301. In this state, the capstan 315 is still rotating, and the auxiliary roller 307 is also rotating. However, the rotation of the take-up reel stand 301 is stopped due to the slip between the pulley 316 provided on the capstan 315 and the belt 318. When the rotation of the take-up reel stand 301 is stopped while the auxiliary roller 307 is rotating, the steel balls 313 and 314 are subjected to only the force due to the rotation of the auxiliary roller 307. This force is in the direction of rotation of the auxiliary roller 307 and also from the deep portion to the shallow portion of each of the grooves 311 and 312. Therefore, each of the steel balls 313 and 314 are displaced from the deep portion to the shallow portion of each of the grooves 311 and 312 to depress the auxiliary roller 307 against the resilient force of the coil spring 310. In this way, the steel balls 313 and 314 are retained in the shallow portions of the grooves 311 and 312, as shown in FIG. 30.

Since the auxiliary roller 307 is pushed downwardly when the steel balls 313 and 314 are displaced to the deep portions of the grooves 311 and 312, the contact portion 321 of the switch 320 is depressed by the lower surface of the auxiliary roller 307 so that the switch 320 is closed. Upon closure of the switch 320, the driving source is reversed which actuates the automatic reversing mechanism and rotates the capstan 315, so that the direction of the tape take-up is reversed.

Although, in the foregoing, description has been made of the case where the switch 320 is switched from an open state to a closed state by the auxiliary roller 307, it is also possible to actuate the related mechanism by the use of a switch which is switched from the closed state to the open state. Also, the automatic stop mechanism can be operated by actuating directly mechanically the levers and the like through the downward displacement of the auxiliary roller 307.

Even if the take-up reel stand 301 and the auxiliary roller 307 are rotated at the same speed, the steel balls 313 and 314 are positioned in the deep portions of the grooves 311 and 312 when both the take-up reel stand 301 and the auxiliary roller are rotated, while the steel balls are displaced to the shallow portions when the rotation of the take-up reel stand 301 is stopped, as in the above case. A similar operation can be performed not only by the aforementioned structure wherein only the auxiliary roller 307 is moved by the displacement of the steel balls 313 and 314 but also by a structure in which the switch or the like is actuated by moving only the take-up reel stand 301 or a structure in which the take-up reel stand 301 and the auxiliary roller 307 are displaced and the switch or the like is actuated through the movement of one or both of the take-up reel stand 301 and the auxiliary roller 307.

In the foregoing, description has been made of the case where the automatic stop mechanism or the like is operated by stopping the rotation of the take-up reel stand 301. However, a similar operation can likewise be performed by means of the supply reel stand 301, a pinch roller (not shown) which is stopped from rotating when the tape transportation is stopped or a separate roller adapted for rotation in association with the tape transportation. The movement of the auxiliary roller 307, take-up reel stand 301 or the like can be effected not only by the combination of the grooves 311 and 312 and the steel balls 313 and 314 but also by a combination of spiral grooves and projections.

With reference to FIGS. 31 to 34, description will now be made of the magnetic recording and reproducing apparatus according to a fourth embodiment of this invention. The reference numerals 401 and 402 represent a supply reel stand and a take-up reel stand which are rotatably mounted on a base plate 403 through a shaft 405 with a predetermined spacing maintained therebetween respectively, 406 a pulley rotatably mounted on the shaft 405 below the take-up reel stand 402, and 407 a slip member such as felt or the like interposed between the pulley 406 and the take-up reel stand 402. The reference numeral 408 denotes a coil spring interposed between the base plate 403 and the bottom surface of the pulley 406 with the shaft 405 inserted therethrough. The coil spring 408 always pushes the pulley 406 toward the take-up reel stand 402.

The reference numeral 409 indicates a follower roller mounted on a shaft 410 in the neighborhood of the take-up reel stand 402, 411 a pulley formed in the lower portion of the follower roller 409, and 412 a rotary lever having one end portion thereof rotatably mounted on the shaft 410 of the follower roller 409. The reference numeral 413 represents a notch formed in the opposite end portion of the rotary lever 412, and 414 an auxiliary roller rotatably mounted on the center portion of the rotary lever 412 by a shaft 415 in such a manner that the auxiliary roller always has the outer periphery thereof disposed in contact with the follower roller 409.

The reference numeral 416 represents a rotary lever having one end portion thereof mounted on the shaft 415 of the auxiliary roller 414, and 417 an intrusion roller of hard rubber or the like rotatably mounted on the opposite end portion of the rotary lever 416 by a shaft 418. The intrusion roller 417 normally has its outer periphery disposed in contact with the outer peripheries of the take-up reel stand 402 and the auxiliary roller 414 at a position shifted from a straight line passing the shaft 405 of the take-up reel stand 402 and the shaft 415 of the auxiliary roller 414.

The reference numeral 419 denotes a spring which always pulls the other end portion of the rotary lever 412 toward the take-up reel stand 402, and 420 a pin which is retained in the notch 413 formed in the other end portion of the rotary lever 412 to maintain the latter at that position which the lever 412 assumes when the intrusion roller 417 is normally placed in contact with the take-up reel stand 402 and the auxiliary roller 414. The reference numeral 421 represents a switch having contact portion 422 positioned in the neighborhood of the other end portion of the rotary lever 412. This switch 421 is closed by being pressed at a position near the contact 422 by the rotary lever 412 when the pin 420 is retained in the notch 413 of the rotary lever 412.

The reference numeral 423 represents a capstan rotated by a driving source such as a motor or the like, and 424 a roller rotatably mounted by a shaft 425, the outer periphery of the roller 424 being pressed against the capstan 423. The reference numeral 426 indicates a pulley formed integrally with the roller 424, and 427 a belt running between the pulley 426 and the pulley 411 of the follower roller 409, part of the folded-back portion thereof being in contact with the pulley 406 formed in the lower portion of the take-up reel stand 402.

Now, description will be made of the operation of the apparatus. When a tape (not shown) placed on the supply reel stand 401 and the take-up reel stand 402 is being transported from the supply reel stand 401 toward the take-up reel stand 402, that is, when the take-up reel stand 402 is being rotated by the belt 427 provided on the pulley 426 of the roller 424 pressed against the capstan 423 due to the friction of the slip member 427, the auxiliary roller 414 is also being rotated by the follower roller 409. In this case, the peripheral speed of rotation of the take-up reel stand 402 is made higher than that of the auxiliary roller 414.

Figure 32:
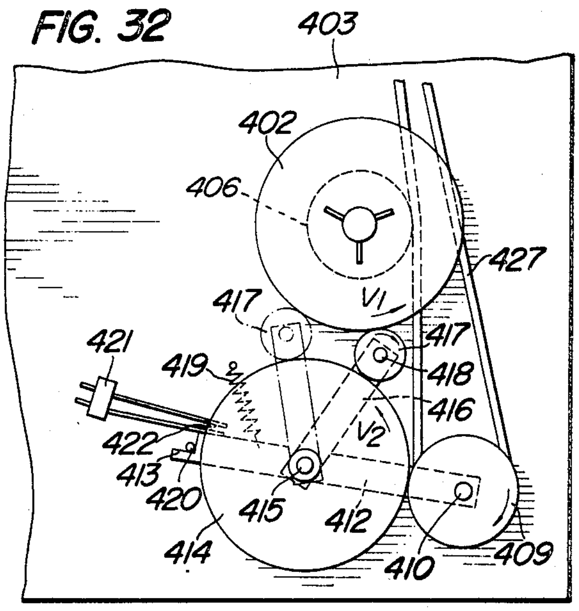
FIG. 32 is a top plan view showing part of the major portion as shown in FIG. 31.

Thus, assuming that the peripheral speed of the take-up reel stand 402 is $V_1$, and that the peripheral speed of the auxiliary roller 414 is $V_2$, then a force corresponding to the peripheral speed difference $V_1 - V_2$ is imparted to the intrusion roller 417 in the direction of rotation of the take-up reel stand 402, so that the roller 417 is idly rotated at the position as shown in FIG. 32. Upon completion of the tape take-up, the tape transportation is stopped since the end of the tape is fixed to the supply reel so that a tensile force is imparted to the tape. In this state, the capstan 423 is still rotating, and the pulley 406 provided below the take-up reel stand 402 is also being rotated by the belt 427. However, the rotation of the take-up reel stand 402 is stopped due to the slip of the slip member 407 interposed between the pulley 406 and the take-up reel stand 402.

Figure 33:
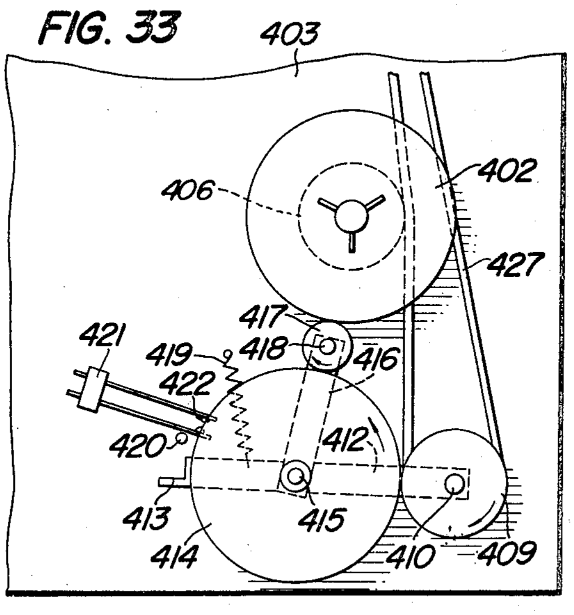
FIG. 33 is a top plan view partially showing the operating state of the major portion.

During the rotation of the capstan 423, the auxiliary roller 414 is being rotated. Thus, if the rotation of the take-up reel stand 402 is stopped, the intrusion roller which has been idly rotating at the position of FIG. 32 is caused to intrude between the auxiliary roller 414 and the take-up reel stand 402 by the rotation of the auxiliary roller 414, so that the roller 417 is displaced in the direction of rotation of the auxiliary roller 414 as shown in FIG. 33. The displacement of the intrusion roller 417 is effected by the rotation of the rotary lever 416 having the roller 417 mounted thereon as the shaft 415. When the intrusion roller 417 is caused to intrude between the auxiliary roller 414 and the take-up reel stand 402, the auxiliary roller 414 is moved away from the take-up reel stand by the roller 417 a distance equal to the difference between the diameter of the intrusion roller 417 and the spacing between the auxiliary roller 414 and the take-up reel stand 402.

This movement of the auxiliary roller 414 is effected by the rotation of the rotary lever 412 about the shaft 410 against the resilient force of the spring 419. Also, the rotation of the rotary lever 412 opens the contact 422 of the switch 421 which has been closed by being pressed by the other end portion of the lever 412. By switching the contact 422 of the switch 421 from the closed state to the open state, it is possible to stop the driving source rotating the capstan, operate the automatic stop mechanism, or reverse the rotation of the driving source to reverse the take-up direction of the tape.

The contact 422 of the switch 421 is switched from the closed state as shown in FIG. 32 to the open state as shown in FIG. 33. Thereafter, the intrustion roller 47 is further moved from the position as shown in FIG. 33 by the rotation of the auxiliary roller 414 until it assumes the position indicated by a phantom line which is symmetrical to the position indicated by a solid line, with a straight line passing through the shaft 405 of the take-up reel stand 402 and the shaft 415 of the auxiliary roller 414 as reference, as shown in FIG. 32. If the intrusion roller 417 is further moved from the position as shown in FIG. 33, then the auxiliary roller 414 is returned to its original position by the spring 419. Consequently, the movable lever 412 is returned to the original position to close the contact 422 of the switch 421 again. Thus, the terminating end of the tape is detected in the state as shown in FIG. 32, and the automatic tape reversing mechanism is operated when the apparatus is changed from the state as shown in FIG. 32 to that as shown in FIG. 33. When the intrusion roller 417 is moved from the position as shown in FIG. 33 to the position as indicated by the phantom line in FIG. 32, the tape direction is changed so that the tape is transported toward the supply reel, while the automatic tape reversing mechanism is being operated. In this state, the rotating directions of the take-up reel stand 402, auxiliary roller 414 and intrusion roller 417 have been reversed.

When the terminating end of the tape is again reached while the take-up reel stand is being reversely rotated, the rotation of the take-up reel stand 402 is stopped, with the result that the intrusion roller 417 is again returned from the position as indicated by the phantom line in FIG. 32 to the original position as indicated by the solid line in FIG. 32 by way of the position as shown in FIG. 33. When the intrusion roller 417 comes to the position as shown in FIG. 33, the contact of the switch 421 is again opened so that the automatic tape reversing mechanism is returned to its original state. From what has been described above, it will be seen that the present invention is effective especially in attempts to operate the automatic tape reversing mechanism.

In the foregoing, description has been made of the case where the switch 421 is switched from the closed state to the open state by the movable lever 412. However, the related mechanism can likewise be operated by such a design that the switch 421 is switched reversely. It is also possible to actuate directly mechanically the automatic reversing mechanism by the movement of the movable lever 412.

Although, in the foregoing, description has been made of the case where the automatic reversing mechanism and the other mechanism are operated by the fact that the take-up reel stand 402 is stopped, a similar operation can equally be achieved by such a structure that the rotary lever 412 is moved by stopping the rotations of the supply reel stand 401, a pinch roller (not shown) which is stopped from rotating when the tape transportation is ceased, a separate roller adapted for rotating integrally with the pinch roller, belt or the like, or by a structure that the auxiliary roller 414 is fixed and supported by a shaft, the take-up reel stand 402 is movable supported by a shaft, and the switch is actuated by the movement of the take-up reel stand 402.

Figure 35:
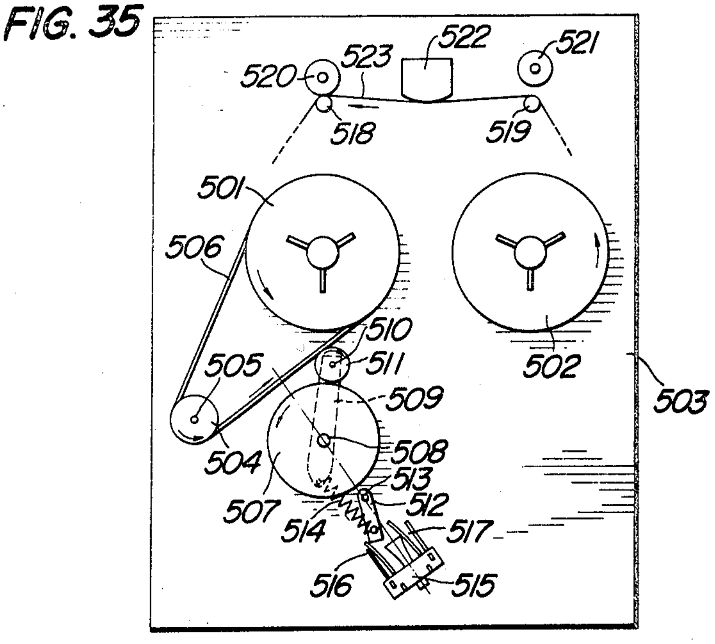
FIG. 35 is a top plan view showing the major portion of the magnetic recording and reproducing apparatus according to a fifth embodiment of this invention.
Figure 36:
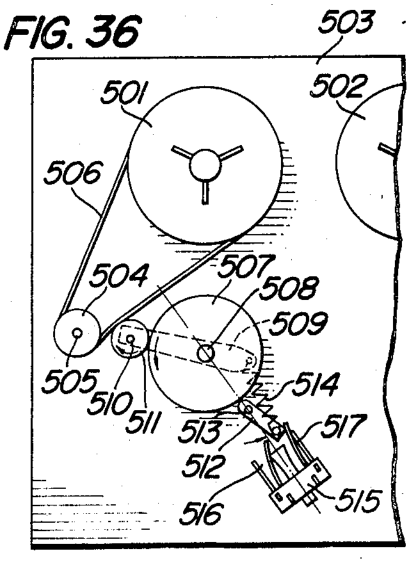
FIG. 36 is a top plan view partially showing the operating state of the major portion as shown in FIG. 35.
Figure 34:
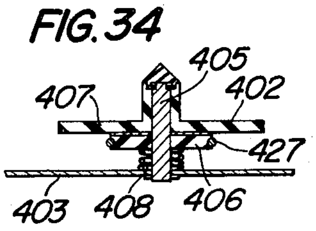
FIG. 34 is a sectional side view showing the take-up reel stand portion of the magnetic recording and reproducing apparatus as shown in FIG. 31.

Referring now to FIGS. 35 and 36, there is shown the magnetic recording and reproducing apparatus according to a fifth embodiment of this invention. In these figures, the reference numerals 501 and 502 represent a take-up reel stand and a supply reel stand which are rotatably supported on a base plate 503 by shafts (not shown), with a predetermined spacing maintained therebetween. Each of the reel stands 501 and 502 is independently rotated by a pulley (not shown) rotated by a driving source such as a motor or the like, through the friction of a slip member.

The reference numeral 504 denotes an idler pulley rotatably supported by a shaft 505 in the neighborhood of the take-up reel stands 501, and 506 a belt formed of a soft elastic material such as rubber or the like running between the idler pulley 504 and the take-up reel stand 501.

The reference numeral 507 indicates an auxiliary roller rotatably supported by a shaft 508 in such a manner that it is slightly spaced apart from the center portion of one folded-back portion of the belt 506 running between the take-up reel stand 501 and the idler pulley 504. The auxiliary roller 507 is rotated at a constant speed by the driving source such as a motor or the like irrespective of the tape transportation. In this case, the rotating direction of the auxiliary roller 507 is opposite to the moving direction of the belt 506, and the peripheral speed of the auxiliary roller is slightly lower than the speed of the belt 506.

The reference numeral 509 represents a rotary lever having the center portion movably mounted on the shaft 508 of the auxiliary roller 507. An intrusion roller 511 is rotatably mounted on one end portion of the lever 509 by a shaft 510, and it is always disposed in contact with the auxiliary roller 507 and the belt 506.

The reference numeral 512 indicates an operational lever rotatably supported by a shaft 513 provided on an extension of a line extending from the shaft 508 of the auxiliary roller 507 perpendicularly with respect to the belt 506, and 514 a spring interposed between the other end portion of the operational lever 512 and the other end portion of the rotary lever 509.

The reference numeral 515 represents a switch having contacts 516 and 517 provided in the neighborhood of the operational lever 512, the center of the switch being on a line passing the shaft 508 of the auxiliary roller 507 and the shaft 513 of the operational lever 512. The contacts 516 and 517 are alternately closed by the movement of the other end portion of the operational lever 512.

The reference numerals 518 and 519 represent capstans which can be alternately driven in the opposite direction to each other by the driving source such as a motor or the like. The reference numerals 520 and 521 denote pinch rollers disposed in opposing relationship with the capstans 518 and 519 respectively, 522 a head provided between the pinch rollers 520 and 521, and 523 a tape extending between the tape reels (not shown) placed on the take-up reel stand 501 and the supply reel stand 502 while being inserted between the capstans 518 and 519 and the pinch rollers 520 and 521.

The operation of this apparatus will be described below. In such a state that the capstan 518 is being driven, that the capstan 519 is stopped, and that the pinch roller 520 is pressed against the capstan 518 to enable the tape to be transported from the supply reel stand 502 to the take-up reel 501, the take-up reel stand 501, supply reel stand 502, belt 506 and auxiliary roller 507 are respectively rotated in the directions indicated by the arrows in FIG. 35.

When the belt 506 and auxiliary roller 507 are rotated as mentioned above, the speed $V_1$ of the belt 506 is higher than the peripheral speed $V_2$ of rotation of the auxiliary roller 507, so that a force in the moving direction of the belt 506 is imparted to the intrusion roller 511. Thus, the roller 511 is idly rotated at a position where it is placed in contact with the belt 506 and auxiliary roller 507 so that the force in the moving direction of the belt 506 and the resilient force of the spring 514 balance with each other.

In such a state where the intrusion roller 511 is being rotated while being subjected to the aforementioned force in the moving direction of the belt 506, the spring 514 is pulled by the other end portion of the rotary lever 512, and the end portion of the operational lever 512 is pulled by the spring so that the end portion is rotated about the shaft 513 to be brought into contact with one contact 516 of the switch 515 thereby closing the contact 516.

When the tape is completely wound on the take-up reel, a tension is applied to the tape since the terminating end of the tape is fixed to the supply reel, so that the tape transportation is stopped. In this state, although the driving source rotating the capstan 518 and take-up reel stand 501 still maintains the operating condition, the rotation of the take-up reel stand 501 and supply reel stand 502 is stopped due to the slip between the capstan 518 and the tape 528 and the slip of the slip member provided between the take-up reel stand 501 and the pulley.

In such a state where the tape transportation has been completed, the auxiliary roller 507 is still being rotated. Therefore, when the belt 506 is stopped by the fact that the take-up reel stand 501 is stopped, the instrusion roller is subjected only to the force of the auxiliary roller 507 so that it is caused to intrude between the belt 506 and the auxiliary roller 507. Thus, the intrusion roller is idly rotated at the same peripheral speed as the auxiliary roller in contact with the belt 506 and auxiliary roller 507 at a position opposite to that in FIG. 35, with a line passing the shaft 508 of the auxiliary roller 507 and the shaft 513 of the operational lever 512 as reference as shown in FIG. 36.

In this state, the other end portion of the rotary lever 509 is moved to a position symmetrical with that of FIG. 35, with a line passing through the shafts 508 and 513 as reference, and the other end portion of the operational lever 512 is similarly moved to be placed into contact with the contact portion 517 of the switch 515 so that the contact 516 is opened while the contact 517 is closed.

By opening or closing the contacts 516 and 517 of the switch 515, the rotation of the capstan 518 is stopped, the pinch roller 520 is separated from the capstan 518, the capstan 519 is rotated in the opposite direction to that of the capstan 518, and the pinch roller 521 is pressed against the capstan 519. Simultaneously, the rotation of the auxiliary roller 507 is reversed, and the supply reel stand 502 is driven. Thus, the tape is automatically reversed so that it is transported from the take-up reel to the supply reel so as to be wound on the latter.

When the transportation of the tape 523 is automatically reversed so that the tape is wound onto the supply reel, the tape-up reel stand 501, supply reel stand 502, belt 506 and auxiliary roller 507 are rotated in the opposite directions to those indicated by arrows in FIG. 35. Thus, the intrusion roller 511 assuming the position as shown in FIG. 36 is idly rotated in the opposite direction to that in which it was rotated in the case of FIG. 35.

When the tape 523 is completely wound on the supply reel, the belt 506 is stopped, and the intrusion roller 511 is again moved to the position in FIG. 35 by the rotation of the auxiliary roller 507, so that the contact 517 of the switch 515 is opened while the contact 516 thereof is closed. As a result, the capstan 518 is again driven to automatically reverse the transportation of the tape. In this way, it is possible to effect automatic two-way reversal of the tape transportation.

Although, in the foregoing, description has been made of the case where the automatic reversal of the tape transportation is effected by switching the contacts 516 and 517 of the switch 515, such automatic reversal can be similarly performed by automatically stopping the tape transport mechanism.

In the foregoing, description has been made of the case where the belt 506 is driven in association with the transportation of the tape 523 while the auxiliary roller 507 is rotated irrespective of such tape transportation. However, a similar operation can be performed by such a design that the belt 506 is driven irrespective of the transportation of the tape 523 while the auxiliary roller 507 is rotated in association with such tape transportation. Also, the belt 507 may be driven from the supply reel stand 502.

Figure 37:
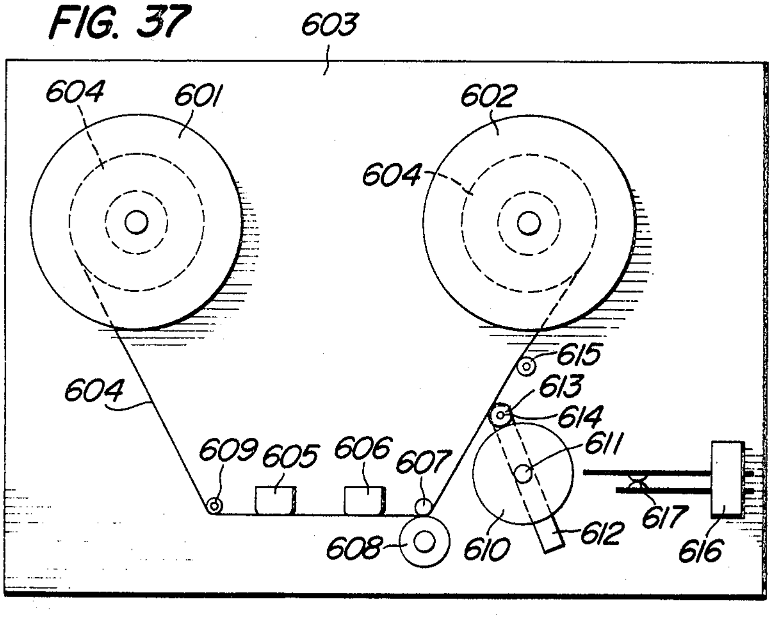
FIG. 37 is a top plan view showing the major portion of the magnetic recording and reproducing apparatus according to a sixth embodiment of this invention.
Figure 38:
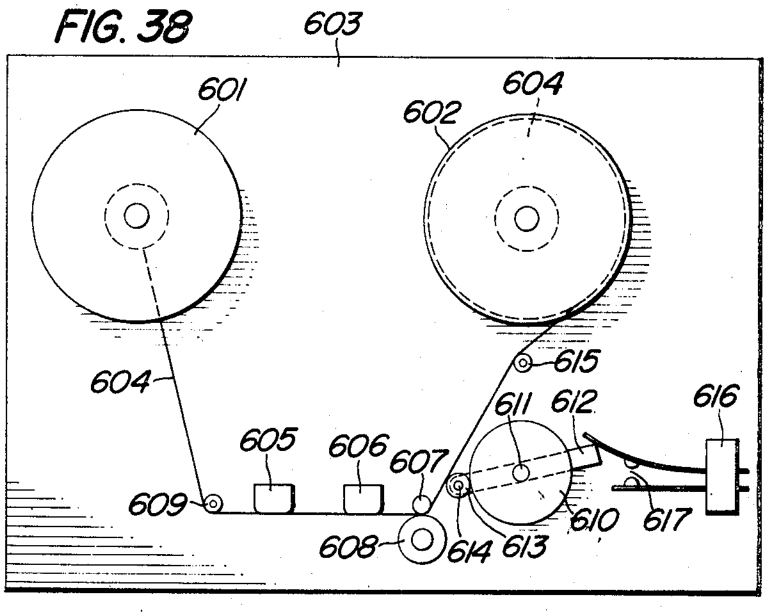
FIG. 38 is a top plan view showing the operating state of the major portion as shown in FIG. 37.

With reference to FIGS. 37 and 38, the magnetic recording and reproducing apparatus according to a sixth embodiment of this invention will be described below. In these figures, the reference numerals 601 and 602 represent a supply reel and a take-up reel placed on reel stands rotatably provided on a base plate 603 with a predetermined spacing maintained therebetween, respectively. The reference numeral 604 denotes a tape wound on the reels 601 and 602 and having the opposite ends thereof fixed thereto, and the reference numerals 605 and 606 indicate heads provided intermediately between and slightly ahead of the two reel stands. The reference numeral 607 represents a capstan provided in the neighborhood of the head 606 and rotated at a constant speed by a driving source such as motor or the like.

The reference numeral 608 indicates a pinch roller which can be pressed against said capstan 607, and 609 a guide roller provided in the neighborhood of the other head 605. The intermediate portion of the tape 604 wound on the supply reel 601 and take-up reel 602 is guided by the guide roller 609 so that it is brought into contact with the heads 605 and 606 and enabled to pass between the capstan 607 and the pinch roller 608. The reference numeral 610 denotes an auxiliary roller rotatably supported by a shaft 611 in the vicinity of the center of that portion of the tape 604 between the capstan 607 and the take-up reel 602. This auxiliary roller 610 is rotated at a constant speed slightly lower than the speed of transportation of the tape 604 which is performed by the rotation of the capstan 607 in the opposite direction to that of the tape transportation by the driving source such as a motor or the like.

The reference numeral 612 represents a movable lever supported at the center thereof by the shaft 611 of the auxiliary roller 610 so that it can be independently rotated, and 613 an intrusion roller which is rotatably provided on one end of the movable lever 612 through a shaft 614. This roller 613 is always disposed in contact with the outer periphery of the auxiliary roller 610 and the tape 604.

The reference numeral 615 denotes a guide roller provided between the intrusion roller 613 and the take-up reel 602 to guide that portion of the tape 604 therebetween, and 616 a switch having a contact portion 617 which is contacted and closed by the other end portion of the movable lever 612 when the latter is rotated.

Description will now be made of the operation of the above structure. In such a state where the pinch roller 608 is pressed against the capstan 607 and the tape 604 is being wound from the supply reel 601 onto the take-up reel 602 by the rotation of the capstan 607, a force in the direction of movement of the tape 604 is imparted to the intrusion roller 613 since the speed $V_1$ of movement of the tape 604 is higher than the peripheral speed $V_2$ of rotation of the auxiliary roller 610. Thus, the intrusion roller 613 is being idly rotated at a peripheral speed $V_1 - V_2$ at a position where it contacts the auxiliary roller 610 and that portion of the tape 604 which is closer to the take-up reel 602. When the tape 604 has been completely fed from the supply reel 601 to the take-up reel 602 so as to be wound on the latter, a tensile force is imparted to the tape 604 since the terminating end of the tape is fixed to the supply reel 601. In this state, although the driving source for the reel stands is still maintained in the operating state, the tape 604 is not transported any more due to a slip occurring between the tape and the capstan 607, and the rotation of the reel stand for the take-up reel 602 is stopped due to a slip of a slip member interposed between the reel stand and a pulley.

Since the auxiliary roller is still being rotated when the tape transportation is stopped, the rotating force of the auxiliary roller 610 is imparted to the intrusion roller 613 so that the latter is rotated with a peripheral velocity of $V_2$ in the opposite direction to that in which it was idly rotated. Thus, the intrusion roller 613 is caused to intrude between the tape 604 and the auxiliary roller 610 and further moved toward the capstan 607 so as to be brought into contact with the tape 604 and the auxiliary roller 610.

The movement of the intrusion roller 613 is effected by the rotation of the movable lever 612 about the shaft 611. When the movable lever 612 is rotated thus, the contact portion 617 of the switch 616 is contacted and closed by the other end portion of the movable lever 612.

As will be appreciated from what has been described above, by switching the contact 617 of the switch 616 from the closed state to the open state, it is possible to stop the driving source rotating the capstan 607 and take-up reel 602, or reverse the rotation of the capstan 607 to drive the supply reel 601 thereby enabling the tape 604 to be wound onto the supply reel 601. In this way, the tape transportation can be automatically reversed.

As will be understood from the foregoing, the magnetic recording and reproducing apparatus according to this invention is advantageous over the conventional apparatus wherein upon completion of the tape transportation the detection is electrically effected by means of a conductor portion provided in the terminating end portion of a tape in that it can be manufactured at very low cost and with so high ruggedness that it is very stable with respect to vibration and shock. Furthermore, the detecting operation can be positively performed, and not only the terminating end of the tape is detected but also the tape is automatically stopped even in case the tape transportation is interrupted by an obstacle so that the components can be prevented from being damaged by such obstacle. In addition, the driving force produced by the movable lever is so great that any mechanism requiring a great force can easily be actuated thereby. From these, it will be seen that the present invention has great industrial utility.

What is claimed is:

1. A magnetic recording and reproducing apparatus, comprising a main rotary member rotated in association with the tape transportation, an auxiliary rotary member rotated irrespective of the tape transportation, and a movable member operated in accordance with the variation in relative rotation between said main and auxiliary rotary members, wherein when the tape transportation is completed, the tape transport mechanism is stopped or reversed directly or through actuation of a switch by the operation of said movable member in accordance with the variation in the relative rotation between said main and auxiliary rotary members.

2. A magnetic recording and reproducing apparatus comprising a main rotary wheel adapted for rotation in association with tape transportation, an auxiliary rotary wheel adapted to be rotated in the opposite direction to that of said main rotary wheel at a slightly lower peripheral speed than that of said main rotary wheel irrespective of the tape transportation, and a roller which is rotatably supported on a rotary lever through a shaft to be in contact with said two rotary wheels, wherein when the rotation of the main rotary wheel is stopped upon completion of the tape transportation, said roller is intruded between the two rotary wheels by the rotation of the auxiliary rotary wheel, and thereby the rotary lever is moved to stop or reverse the tape transport mechanism directly or by actuating switches.

3. A magnetic recording and reproducing apparatus, comprising a main rotary wheel adapted for rotation in association with the tape transportation, an auxiliary rotary wheel concentrical with said main rotary wheel and rotated in the same direction as said main rotary wheel irrespective of the tape transporation, and a mechanism adapted to axially move one or both of said main and auxiliary rotary wheels when the rotation of the main rotary wheel is stopped, wherein upon completion of the tape transporation, a lever or the like is moved by the axial movement of said main rotary wheel or said auxiliary rotary wheel through a switch or directly, thereby operating an automatic tape stopping mechanism.

4. A magnetic recording and reproducing apparatus, comprising a main rotary wheel adapted for rotating in association with the tape transportation, an auxiliary rotary wheel adapted for rotating at a lower peripheral speed than that of the main rotary wheel in the opposite direction to that of the main rotary wheel irrespective of the tape transportation, either one of the main and auxiliary rotary wheels being movable, and a movable roller rotatable in contact with said rotary wheels, wherein when the rotation of said one rotary wheel is stopped upon completion of the tape transportation, said roller is caused to intrude between the two rotary wheels by the rotation of the auxiliary rotary wheel so that said one rotary wheel is moved to stop or reverse the tape transport mechanism directly or through actuation of switch means.

5. A magnetic recording and reproducing apparatus, comprising a belt driven in association with the tape transportation, an auxiliary rotary wheel provided adjacent to the belt and rotated irrespective of said tape transportation at a lower peripheral speed than the speed of the belt in the opposite direction to that of the belt, and an intrusion roller rotatable and movable in contact with said auxiliary rotary wheel and said belt, wherein upon completion of the tape transportation, said belt is stopped, said intrusion roller is moved, and a detector mechanism is operated by the movement of said intrusion roller, whereby the tape transport mechanism is reversed or stopped.

6. A magnetic recording and reproducing apparatus, comprising an auxiliary rotary wheel provided in the neighborhood of the tape transported from a supply reel to a take-up reel and rotated, irrespective of the tape transportation, at a constant speed lower than the speed of the tape transportation in the opposite direction to that of said tape transportation, and an intrusion roller rotatable and movable in contact with said tape and said auxiliary rotary wheel, wherein when the tape has been completely wound on the take-up reel, the tape is stopped, and the intrusion roller is moved to operate a detector mechanism whereby the tape transport mechanism is reversed or stopped.

References Cited

UNITED STATES PATENTS

| | | | |
|---|---|---|---|
| 3,026,057 | 3/1962 | Horimura | 242—55.12 |
| 3,051,405 | 8/1962 | Lyon | 242—55.12 |
| 3,167,264 | 1/1965 | Ohtsu | 242—55.12 |

LEONARD D. CHRISTIAN, Primary Examiner

U.S. Cl. X.R.

242—57